(12) United States Patent
Clemen, Jr. et al.

(10) Patent No.: US 10,680,400 B2
(45) Date of Patent: Jun. 9, 2020

(54) APPARATUS AND METHOD FOR GENERATING A HIGH POWER ENERGY BEAM BASED LASER

(71) Applicant: THE BOEING COMPANY, Chicago, IL (US)

(72) Inventors: Mark Joseph Clemen, Jr., Port Orchard, WA (US); John R. Hull, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 99 days.

(21) Appl. No.: 15/785,022

(22) Filed: Oct. 16, 2017

(65) Prior Publication Data

US 2019/0115713 A1    Apr. 18, 2019

(51) Int. Cl.
| | | |
|---|---|---|
| *H01S 3/032* | (2006.01) | |
| *H01S 3/07* | (2006.01) | |
| *H01S 3/0975* | (2006.01) | |
| *H01S 3/102* | (2006.01) | |
| *H01S 3/0959* | (2006.01) | |
| *H01S 3/10* | (2006.01) | |

(52) U.S. Cl.
CPC .............. *H01S 3/0326* (2013.01); *H01S 3/07* (2013.01); *H01S 3/0959* (2013.01); *H01S 3/0975* (2013.01); *H01S 3/102* (2013.01); *H01S 3/10092* (2013.01)

(58) Field of Classification Search
CPC ...... H01S 3/0326; H01S 3/0959; H01S 3/102; H01S 3/0975; H01S 3/07; H01S 3/10092; H01S 3/0903
See application file for complete search history.

(56) References Cited

U.S. PATENT DOCUMENTS

| | | | |
|---|---|---|---|
| 4,305,784 A | | 12/1981 | Ohkawa |
| 5,010,555 A | * | 4/1991 | Madey .................. H01S 3/0903 |
| | | | 372/100 |
| 6,445,130 B1 | * | 9/2002 | Leupold ................ H01F 7/0278 |
| | | | 315/4 |

OTHER PUBLICATIONS

Wikipedia; "Free-electron laser," downloaded from <https://en.wikipedia.org/wiki/Free-electron_laser> on Oct. 13, 2017, 8 Pages.
Motz, H.; "Applications of the Radiation from Fast Electron Beams," Journal of Applied Physics, 1951, pp. 527-535, vol. 22.

* cited by examiner

*Primary Examiner* — Xinning(Tom) Niu
(74) *Attorney, Agent, or Firm* — Sage Patent Group

(57) ABSTRACT

A system for generating an energy beam based laser includes an apparatus for receiving an energy beam and for generating an energy beam based laser. The apparatus is configurable or controllable for tuning an output wavelength of the laser generated by the apparatus using the energy beam. The apparatus includes a first component for producing a first magnetic field oriented in a first direction and a second component for producing a second magnetic field oriented in a second direction substantially opposite to the first direction. A channel through the apparatus is defined by the first component and the second component through which the energy beam passes to generate the laser at an output of the apparatus. The apparatus is configurable or controllable for modifying at least one of the first magnetic field and the second magnetic field for tuning the output wavelength of the laser.

20 Claims, 16 Drawing Sheets

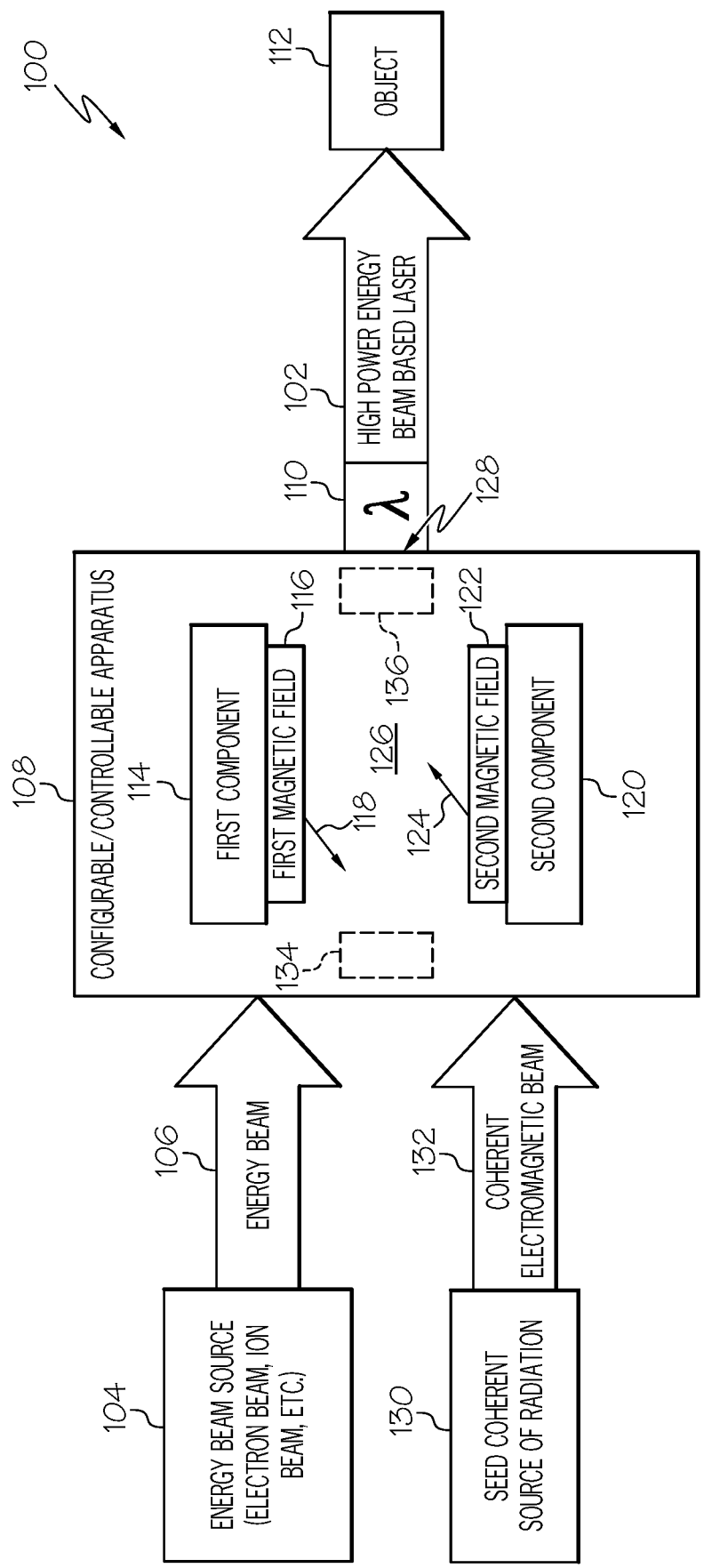

APPARATUS AND METHOD FOR GENERATING A HIGH POWER ENERGY BEAM BASED LASER

CROSS REFERENCE TO RELATED APPLICATION

This application is related to U.S. application Ser. No. 15/784,831, entitled "Apparatus and Method for Magnetic Field Compression," which is assigned to the same assignee as the present application, filed on the same date as the present application, and is incorporated herein by reference.

This application is related to U.S. application Ser. No. 15/785,155, entitled "Apparatus and Method for Magnetic Field Compression Using a Toroid Coil Structure," which is assigned to the same assignee as the present application, filed on the same date as the present application, and is incorporated herein by reference.

FIELD

The present disclosure relates to devices and methods for generating a laser and more particularly to an apparatus and method for generating a high power energy beam based laser.

BACKGROUND

Free-electron lasers are a type of laser whose lasing medium consists of very high speed electrons moving freely through a magnetic structure. The magnetic structure is typically heavy and bulky and therefore presents limitations on applications of the laser or requires special accommodations that may not be practical in some environments. Additionally, such lasers have a fixed output wavelength and are not tunable in real-time. There may also be alignment sensitivities with optical elements associated with the laser and output powers are limited. Accordingly, there is a need to provide an apparatus and method for generating a high power energy beam based laser that is not subject to these disadvantages.

SUMMARY

In accordance with an embodiment, a system for generating an energy beam based laser includes an apparatus for receiving an energy beam and for generating an energy beam based laser. The apparatus is configurable or controllable for tuning an output wavelength of the laser generated by the apparatus using the energy beam. The apparatus includes a first component for producing a first magnetic field oriented in a first direction and a second component for producing a second magnetic field oriented in a second direction substantially opposite to the first direction. A channel through the apparatus is defined by the first component and the second component through which the energy beam passes to generate the laser at an output of the apparatus. The apparatus is configurable or controllable for modifying at least one of the first magnetic field and the second magnetic field for tuning the output wavelength of the laser.

In accordance with another embodiment, a system for generating an energy beam based laser includes an apparatus for receiving an energy beam and for generating an energy beam based laser. The apparatus is configurable or controllable for tuning an output wavelength of the laser generated by the apparatus using the energy beam. The apparatus includes a first toroid and a first plurality of separate coils wound around the first toroid. The first plurality of coils is placed about a circumference of the first toroid and each coil generates a first magnetic field in response to electric current flowing in the coil. The apparatus additionally includes a second toroid and a second plurality of separate coils wound around the second toroid. The second plurality of coils is placed about a circumference of the second toroid and each coil generates a second magnetic field in response to electric current flowing in the coil. A circular center opening of the first toroid and the second toroid are in a same plane and the second toroid is disposed adjacent the first toroid at a predetermined distance from the first toroid. The apparatus further includes a magnetic or diamagnetic material enclosing the first plurality of coils and the second plurality of coils. An elongated slot is formed in the magnetic or diamagnetic material at a location where coils of the first plurality of coils and the second plurality of coils are closest. The elongated slot extends radially between two adjacent coils of the first plurality of separate coils and two adjacent coils of the second plurality of separate coils. The elongated slot defines a channel through which the energy beam passes to generate the laser at an output of the apparatus. The apparatus is configurable or controllable for modifying at least one of the first magnetic field and the second magnetic field for tuning the output wavelength of the laser.

In accordance with another embodiment, a method for generating an energy beam based laser includes receiving an energy beam by an apparatus that is configurable or controllable for tuning an output wavelength of a laser generated by the apparatus using the energy beam. The method also includes producing a first magnetic field oriented in a first direction and producing a second magnetic field oriented in a second direction substantially opposite to the first direction. The method additionally includes defining a channel through the apparatus through which the energy beam passes. The method further includes modifying at least one of the first magnetic field and the second magnetic field in the channel for tuning the output wavelength of the laser.

In accordance with another embodiment or any of the previous embodiments, the first component includes a first set of elongated magnets. Each magnet of the first set of elongated magnets includes a narrow side extending a length of the channel on one side of the channel. The second component includes a second set of elongated magnets. Each magnet of the second set of magnets includes a narrow side extending a length of the channel on another side of the channel from the first set of magnets. A north or south pole at the narrow side of each magnet of the first set of magnets is paired with an opposite pole at the narrow side of an associated magnet of the second set of magnets on the other side of the channel.

In accordance with another embodiment or any of the previous embodiments, a magnetic field tuning magnet or shim is disposed adjacent one or more magnets of the first set of elongated magnets and/or the second set of elongated magnets to modify at least one of the first magnetic field and the second magnetic field for tuning the output wavelength of the laser.

In accordance with another embodiment or any of the previous embodiments, wherein the first component and the second component each include a plurality of tubes of different dimensions. Each smaller tube extends within a larger tube and each tube includes an electrically conductive material for generating one of the first magnetic field and the second magnetic field in response to electric current flowing in the conductive material. The first component and the second component also each include an elongated slot formed in each tube. The elongated slot in each tube is aligned to form a first aperture in the first component and a second aperture in the second component. The first aperture is aligned with the second aperture to form the channel through the apparatus in which the first magnetic field and the second magnetic field are both compressed in response to the electric current flowing in the conductive material of each tube.

In accordance with another embodiment or any of the previous embodiments, wherein each of the plurality of tubes include a substrate including an inner surface and an outer surface. An inside layer of electrically conductive material or semiconductor material is disposed on the inner surface of each substrate of those tubes that enclose another tube of the plurality of tubes. An outside layer of electrically conductive material or semiconductor material is disposed on the outer surface of each substrate of those tubes that are enclosed by another tube of the plurality of tubes.

In accordance with another embodiment or any of the previous embodiments, the substrate includes one of an electrical insulator material, an electrical semiconductor material or an electrical conductive material and wherein the inside layer and the outside layer of electrically conductive material or semiconductor material comprise a superconducting material.

In accordance with another embodiment or any of the previous embodiments, an electric current supply is electrically connected to each inside layer of electrically conductive material and each outside layer of electrically conductive material for generating an electric current flow in each layer of electrically conductive material and a compressed first magnetic field and second magnetic field in the channel.

In accordance with another embodiment or any of the previous embodiments, each electric current supply is adjustable for adjusting a balance of currents among the plurality of tubes and modifying at least one of the first magnetic field and the second magnetic field across the channel for tuning the output wavelength of the laser. The electric currents include one of continuous electric currents, alternating electric currents or pulsed electric currents.

In accordance with another embodiment or any of the previous embodiments, at least one of the inside layer of electrically conductive material or the outside layer of electrically conductive material includes a plurality of ridges for modulating the electric current flowing in the layer of electrically conductive material for modifying at least one of the first magnetic field and the second magnetic field across the channel for tuning the output wavelength of the laser.

In accordance with another embodiment or any of the previous embodiments, the first component includes a first toroid and a first plurality of separate coils wound around the first toroid. The first plurality of coils is placed about a circumference of the first toroid and each coil generates a first magnetic field in response to electric current flowing in the coil. The second component includes a second toroid and a second plurality of separate coils wound around the second toroid. The second plurality of coils is placed about a circumference of the second toroid and each coil generates a second magnetic field in response to electric current flowing in the coil. A circular center opening of the first toroid and the second toroid are in a same plane and the second toroid is disposed adjacent the first toroid at a predetermined distance from the first toroid. The apparatus further includes a magnetic or diamagnetic material enclosing the first plurality of coils and the second plurality of coils. An elongated slot is formed in the magnetic or diamagnetic material at a location where coils of the first plurality of coils and the second plurality of coils are closest. The elongated slot extends radially between two adjacent coils of the first plurality of separate coils and two adjacent coils of the second plurality of separate coils. The elongated slot defines the channel through which the energy beam passes to generate the laser.

In accordance with another embodiment or any of the previous embodiments, the first toroid, the first plurality of coils around the first toroid, the second toroid and the second plurality of coils around the second toroid include opposite rounded ends connected by elongated sides.

In accordance with another embodiment or any of the previous embodiment, each of the coils includes a uniform radial width.

In accordance with another embodiment or any of the previous embodiments, a first group of the coils of the first plurality of coils and a second group of coils of the second plurality of coils each include a size that respectively gradually decrease over about half or less than about a circumference of each of the first toroid and the second toroid from respective pairs of points on each toroid that are spaced about half or less than about the circumference apart on each toroid to modify the first magnetic field and the second magnetic field in the elongated slot for tuning the output wavelength of the laser In accordance with another embodiment or any of the previous embodiments, the two adjacent coils of the first plurality of separate coils and the two adjacent coils of the second plurality of separate coils that are proximate the elongated slot are rotated a predetermined number of degrees with respect to the elongated slot to modify at least one of the first magnetic field and the second magnetic field in the elongated slot for tuning the output wavelength of the laser.

In accordance with another embodiment or any of the previous embodiments, the predetermined distance between the first toroid and the second toroid is changed to modify the first magnetic field and the second magnetic field in the elongated slot for tuning the output wavelength of the laser.

In accordance with another embodiment or any of the previous embodiments, a segment of magnetic or diamagnetic material is inserted into a selected location in the elongated slot to modify at least one of the first magnetic field and the second magnetic field in the elongated slot for tuning the output wavelength of the laser.

In accordance with another embodiment or any of the previous embodiments, a variable electric current supply is electrically connected to at least coils proximate the elongated slot, wherein the electric current flowing in the coils is modulated to modify at least one of the first magnetic field and the second magnetic field in the elongated slot for tuning the output wavelength of the laser.

In accordance with another embodiment or any of the previous embodiments, the apparatus is configurable or controllable for tuning the output wavelength of the laser by at least one of: rotating coils proximate the elongated slot a predetermined number of degrees with respect to the elongated slot to modify at least one of the first magnetic field and the second magnetic field in the elongated slot for tuning the output wavelength of the laser; decreasing a radial width of coils proximate the slot to modify at least one of the first magnetic field and the second magnetic field in the elongated slot for tuning the output wavelength of the laser; adjusting the predetermined distance between the first toroid and the second toroid to modify at least one of the first magnetic field and the second magnetic field in the elongated slot for tuning the output wavelength of the laser;

inserting a segment of magnetic or diamagnetic material into a selected location in the elongated slot to modify at least one of the first magnetic field and the second magnetic field in the elongated slot for tuning the output wavelength of the laser; and modulating the electric current flowing in the coils to modify at least one of the first magnetic field and the second magnetic field in the elongated slot for tuning the output wavelength of the laser.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 1 is a block schematic diagram of an example of a system for generating a high power energy beam based laser in accordance with an embodiment of the present disclosure.

DETAILED DESCRIPTION

Figure 2A:
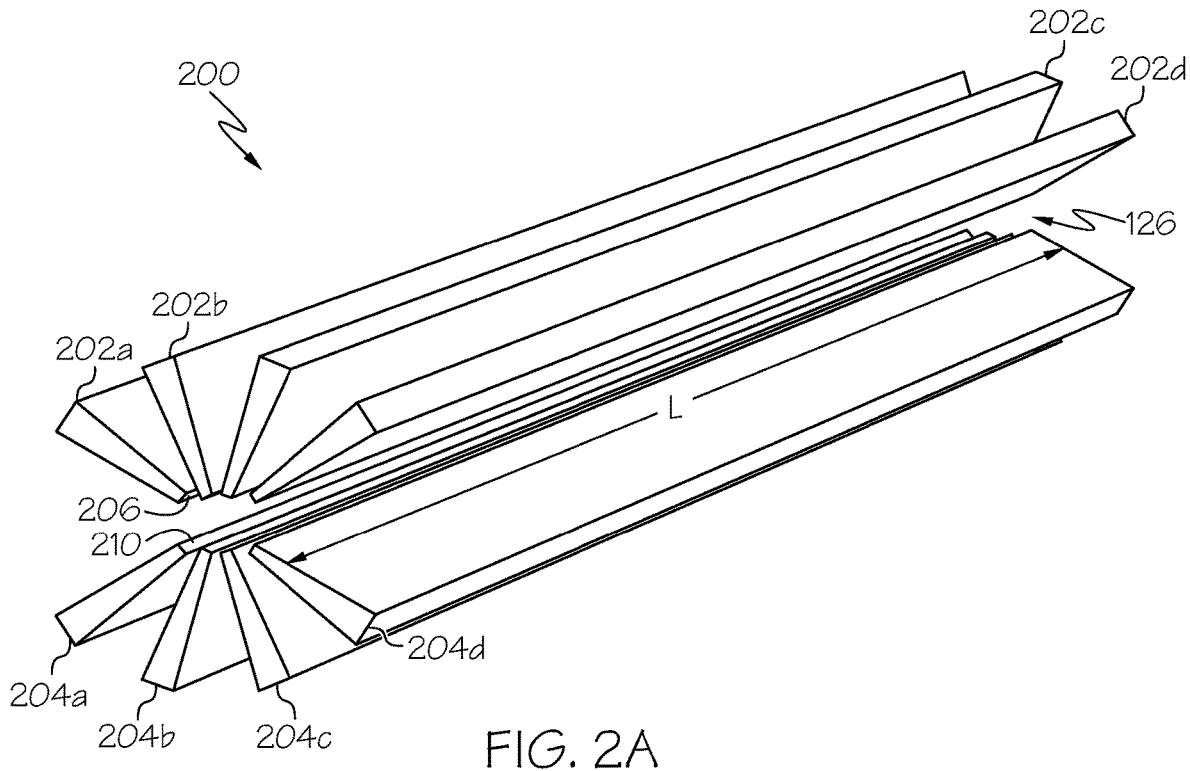
FIG. 2A is a perspective view of an example of an apparatus for use as a quantum well in a system for generating a high power energy beam based laser in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 is a block schematic diagram of an example of a system 100 for generating a high power energy beam based laser 102 in accordance with an embodiment of the present disclosure. An example of the high power energy beam based laser 102 is between about one (1) kilowatt and hundreds of megawatts of continuous or pulsed laser power. The system 100 includes an energy source 104 for generating an energy beam 106. In accordance with an embodiment, the energy source 104 is an energy source that generates one of an electron beam, an ion beam or other type energy beam or charged particle beam. Accordingly, the energy beam 106 is one of an electron beam, an ion beam or other type energy beam or charge particle beam. The system 100 also includes an apparatus 108 for receiving the energy beam 106, for generating the high power energy beam based laser 102 using the input energy beam 106, and for real-time variable wavelength operation. In accordance with an embodiment, the apparatus 108 is a quantum well structure that is configured specifically to an energy structure best suited for the energy beam based laser 102. The apparatus 108 is configurable or controllable for tuning in real-time an output wavelength ($\lambda$) 110 of the laser 102 generated by the apparatus 108 using the input energy beam 106 as described herein in more detail with respect to the different embodiments of the apparatus 108. In accordance with an embodiment, the laser 102 is directed on an object 112 to perform an operation on the object 112. Examples of the operations performed on the object 112 include but are not limited to manufacturing operations, cutting operations, welding operations, surgical operations, or other operations where a free-electron laser is applicable.

The apparatus 108 includes a first component 114 for producing a first magnetic field 116 oriented in a first direction 118. The apparatus 108 also includes a second component 120 for producing a second magnetic field 122 oriented in a second direction 124 substantially opposite to the first direction 118. The second direction 124 may be substantially opposite the first direction 118 in that that the second direction 124 may not be exactly opposite the first direction 118, or in another embodiment, the second magnetic field 122 may be in a direction intentionally offset from being in a direction exactly opposite the first magnetic field 116 for tuning the output wavelength 110 of the laser 102 similar to that described herein.

A channel 126 through the apparatus 108 is defined by the first component 114 and the second component 120 through which the energy beam 106 passes to generate the laser 102 at an output 128 of the apparatus 108. The apparatus 108 is configurable or controllable for modifying at least one of the first magnetic field 116 or the second magnetic field 122 for tuning the output wavelength 110 of the laser 102. Examples of different embodiments of the apparatus 108 will be described with reference to FIGS. 2A-2B, FIGS. 3A-3C, FIG. 6, FIGS. 7A-7C, FIGS. 9A-9B and FIG. 10.

In accordance with an embodiment, a seed coherent source of radiation 130, such as a laser or microwave source that has a lower power than the high power energy beam laser 102 directs a coherent electromagnetic beam 132 of some type into the channel 126 or lasing medium created in the channel 126 by the energy beam 106 or particle beam. Examples of types the coherent electromagnetic beams 132 include infrared, light, x-ray, etc. The high power energy beam 102 is generated from the coherent electromagnetic energy beam 132.

In accordance with another embodiment, a fully reflective mirror 134 is positioned proximate a front end of the channel 126 and a semi-reflective mirror 136 or half-reflective mirror is positioned proximate an opposite end of the channel 126 or output 128 of the apparatus 108. In this embodiment, the high power energy beam based laser 102 is generated by self-amplification by the energy beam 106 or light beam being reflected back and forth between the mirrors 134 and 136 within the channel 126 or lasing medium in the channel 126.

Figure 2B:
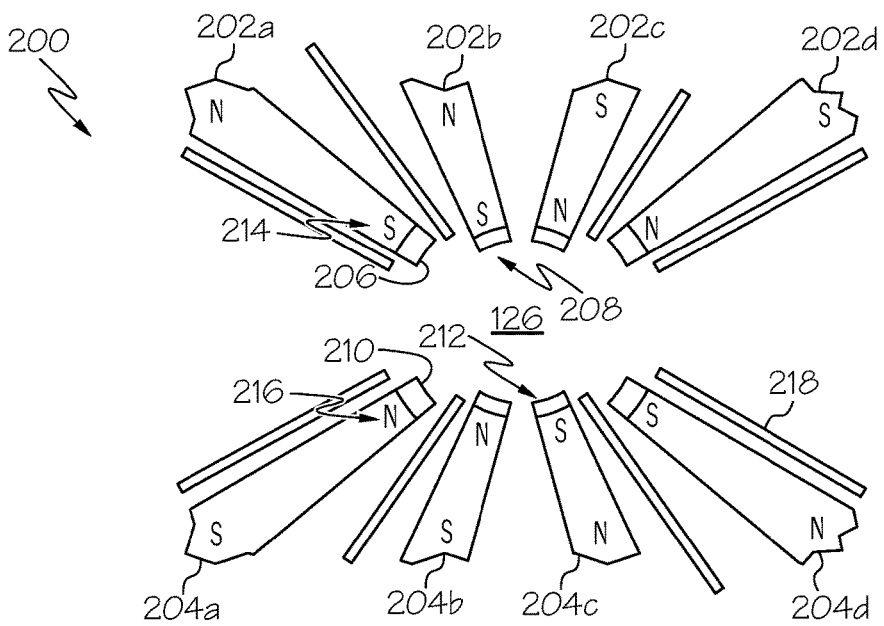
FIG. 2B is an end view of the exemplary apparatus in FIG. 1A.

FIG. 2A is a perspective view of an example of an apparatus 200 for use as a quantum well in a system for generating a high power energy beam based laser in accordance with an embodiment of the present disclosure. FIG. 2B is an end view of the exemplary apparatus 200 in FIG. 1A. In accordance with an embodiment, the apparatus 200 is used for the apparatus 108 in in the system 100 in FIG. 1. The apparatus 200 includes a first set of elongated magnets 202a-202d and a second set of elongated magnets 204a-204d. The first set of elongated magnets 202a-202d correspond to the first component 114 of apparatus 108 in FIG. 1. The second set of magnets 204a-204d correspond to the second component 120 in FIG. 1. Each magnet 202 of the first set of magnets 202a-202d includes a narrow side 206 that extends a longitudinal length "L" of the channel 126 on one side 208 (FIG. 2B) of the channel 126. Each magnet 204 of the second set of magnets 204a-204d includes a narrow side 210 extending the longitudinal length "L" of the channel 126 on another side 212 of the channel 126 from the first set of magnets 202a-202d. A north or south pole 214 at the narrow side 206 of each magnet 202 of the first set of magnets 202a-202d is paired with an opposite pole 216 at the narrow side 210 of an associated magnet 204 of the second set of magnets 204a-204d on the other side 212 of the channel 126.

In accordance with an embodiment, the first set of elongated magnets 202a-202d and the second set of elongated magnets 204a-204d are permanent magnets. In other embodiments, the first set of elongated magnets 202a-202d and the second set of elongated magnets 204a-204d are electromagnets or other types of magnets. While the first set of elongated magnets 202a-202d and the second set of magnets 204a-204d are shown as each including four magnets, each set of magnets may include any number of elongated magnets and the magnets may be any size depending upon the size and application of the apparatus 200.

The apparatus 200 further includes a magnetic field tuning magnet 218 or shim disposed adjacent one or more magnets 202 or 204, or between one or more adjacent magnets 202 or 204 of the first set of elongated magnets 202a-202d and/or the second set of elongated magnets 204a-204d to modify at least one of the first magnetic field 116 (FIG. 1) and the second magnetic field 122 (FIG. 1) for tuning the output wavelength 110 of the laser 102.

Figure 3A:
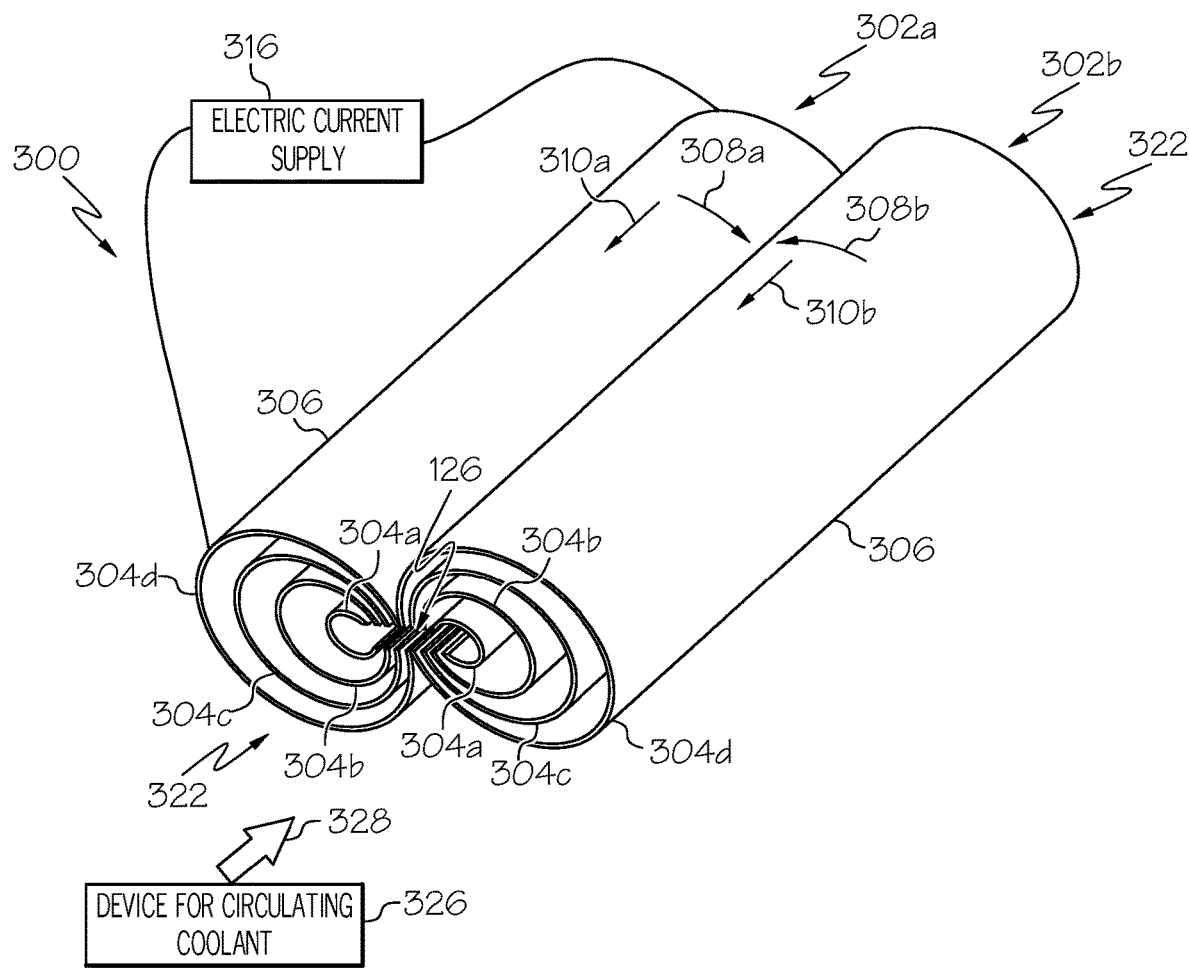
FIG. 3A is a perspective view of an example of another apparatus for use as a quantum well in a system for generating a high power energy beam based laser in accordance with another embodiment of the present disclosure.
Figure 3B:
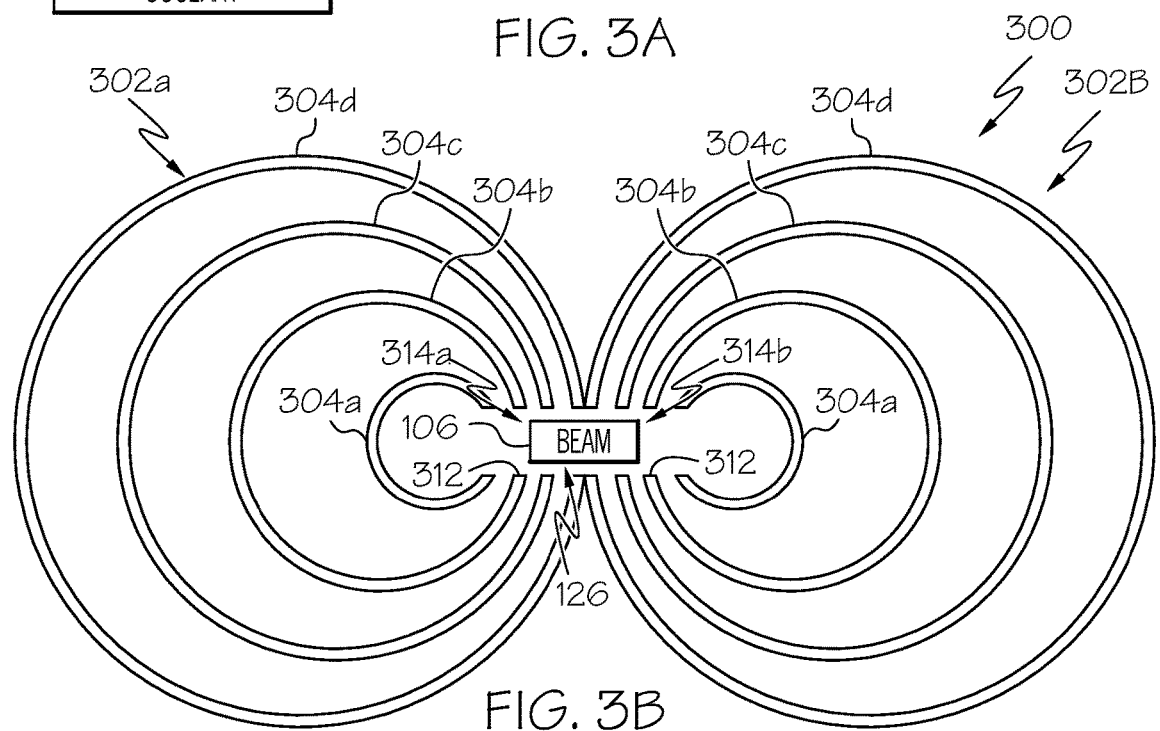
FIG. 3B is an end view of the exemplary apparatus in FIG. 3A.

FIG. 3A is a perspective view of an example of another apparatus 300 for use as a quantum well in a system for generating a high power energy beam based laser in accordance with another embodiment of the present disclosure. FIG. 3B is an end view of the exemplary apparatus 300 in FIG. 3A. In accordance with an embodiment, the apparatus 300 is used for the apparatus 108 in the system 100 in FIG. 1. The apparatus 300 is similar to the apparatus 600 described in U.S. application Ser. No. 15/784,831, entitled "Apparatus and Method for Magnetic Field Compression," which is assigned to the same assignee as the present application and is incorporated herein by reference. The apparatus 300 includes a first component 302a and a second component 302b. Each of the components 302a and 302b is similar to the apparatus 100 in FIGS. 1A-1B in in U.S. application Ser. No. 15/784,831. The first component 302a is substantially identical to the second component 302b. The first component 302a and the second component 302d each include a plurality of tubes 304a-304d of different dimensions or diameters. In the exemplary embodiment in FIGS. 3A, 3B and 3C, the tubes 304a-304d are nonconcentric and cylindrically shaped and each tube 304a-304d includes a different diameter. In other embodiments, the tubes 304a-304d are non-cylindrically shaped. For example, each tube 304a-304d is substantially rectangular shaped similar to that illustrated in the exemplary embodiment illustrated in FIG. 5. Other embodiments include tubes 304a-304d having other types of non-cylindrical shapes depending upon the design of the apparatus 300 or 108 in FIG. 1 or particular application or use of the apparatus 300 or 108 or the system 100. In accordance with other embodiments, the apparatus 300 includes two tubes 304a and 304b or any number of tubes 304a-304n depending upon the design and application of the apparatus 300 or system 100 in FIG. 1. The dimension or diameter of the tubes 304a-304d is also based on the design and application of the apparatus 300. In accordance with the embodiment illustrated in FIGS. 3A, 3B and 3C, the tubes 304a-304d are nonconcentric in that a center or longitudinal axis of each tube 304a-304d is offset or spaced a predetermined distance from a center or longitudinal axis of a subsequent or adjacent outer tube. In other embodiments, the tubes 304a-304d are concentric or have some other configuration.

Each smaller tube 304 is disposed within a larger tube 304 of the plurality of tubes 304a-304b and extends within the larger tube 304 and parallel with the larger tube 304. Each tube 304a-304d includes an electrically conductive material 306 or semiconductor material for generating a magnetic field, illustrated by arrows 308a and 308b, in response to electric current 310a and 310b respectively flowing in the conductive material 306 of the tubes 304a-304d of the first component 302a and the second component 302b. As described in more detail with reference to FIGS. 3C and 4, the conductive material 306 is on an outer surface of some tubes 304a-304d, an inner surface of some tubes 304a-304d, or on both an outer surface and inner surface depending upon whether the tube 304 is enclosed by another larger tube or the tube encloses another smaller tube and a magnetic field is to be generated in a gap between adjacent tubes 304a-304d by current flowing in opposite directions in the conductive material 306 in the adjacent tubes 304a-304d. Generally, the conductive material 306 is placed on the facing or opposing surfaces of adjacent tubes 304a-304d to generate a magnetic field 308 in the gap between the adjacent tubes 304a-304d in response to electric current 310 flowing in opposite directions in the conductive material 306 of the adjacent tubes 304a-304d. Examples of the electrically conductive material 306 will be described in more detail with reference to FIG. 4. In accordance with an embodiment, an electric current supply 316 is electrically connected across the electrically conductive material 306 of each tube 304a-304d of each component 302a and 302b to cause electric current 310 to flow in the electrically conductive material 306 of the tubes 304a-304d.

An elongated slot 312, as best shown in FIG. 3B, is formed in each tube 304a-304d. The elongated slot 312 in each tube 304a-304d is aligned to form a first aperture 314a in the first component 302a and a second aperture 314b in the second component 302b. The first aperture 314a is aligned with the second aperture 314b to form the channel 126 (FIG. 1) through the apparatus 300 through which the energy beam 106 passes to generate the laser 102 at an output 128 of the apparatus 300. The first magnetic field 308a and the second magnetic field 308b are both compressed in the channel 126 as described in more detail with reference to FIG. 3C in response to the electric current 310a and 310b flowing in the conductive material 306 of each tube 304a-304d to generate the laser 102 or laser beam. As described in more detail herein, the electric current supply 316 or supplies are adjustable current supplies for adjusting or modulating at least one of the electric currents 310a and 310b flowing in the conductive material 306 for modifying at least one of the first magnetic field 308a or the second magnetic field 308b across the channel 126 for tuning the output wavelength ($\lambda$) 110 of the energy beam based laser 102.

Figure 3C:
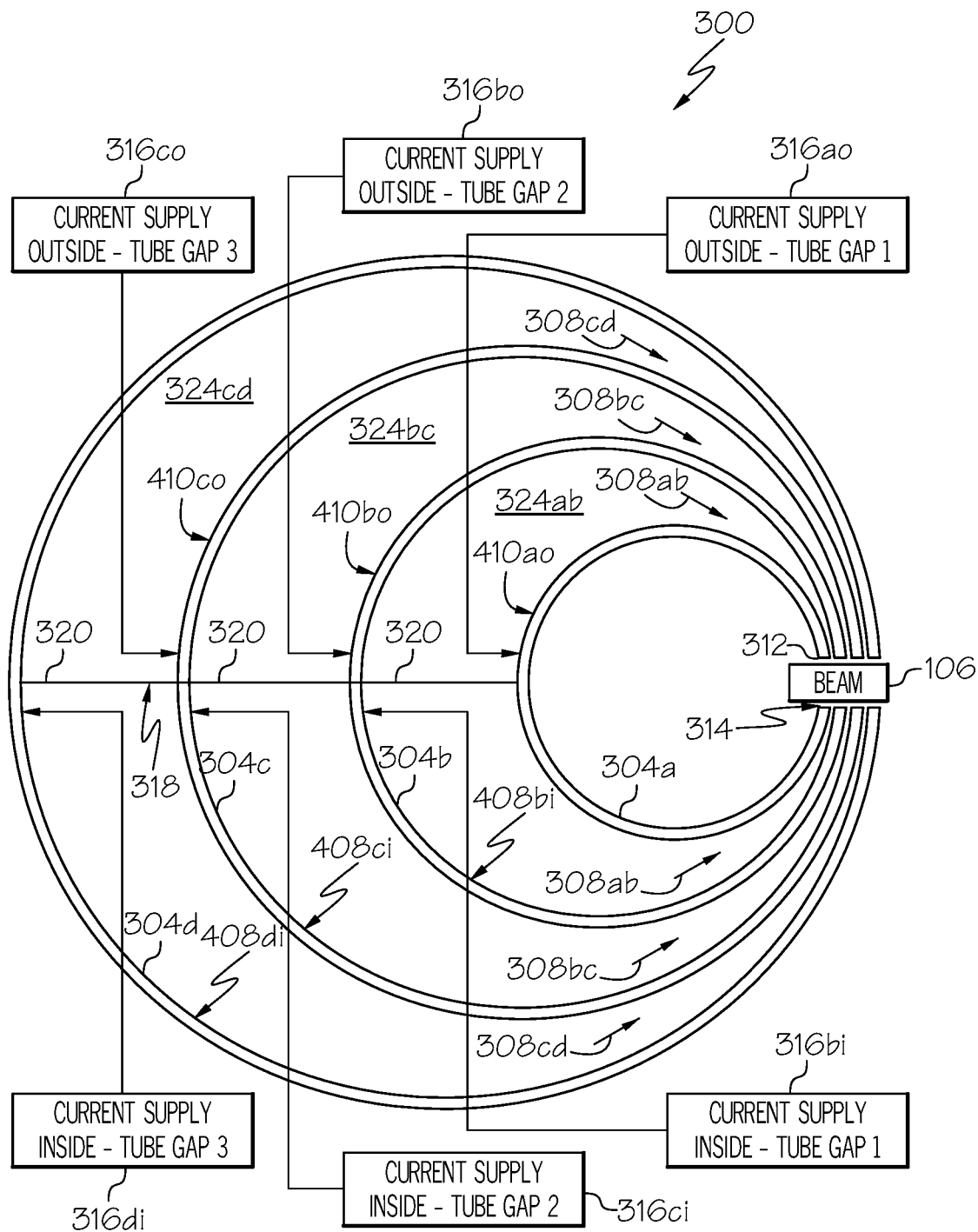
FIG. 3C is a detailed end view of one components of the exemplary apparatus in FIGS. 3A and 3B illustrating electrical connection to the tubes of the apparatus in accordance with an embodiment of the present disclosure.

FIG. 3C is a detailed end view of one of the components 302a or 302b of the exemplary apparatus 300 in FIGS. 3A and 3B illustrating electrical connection to the nonconcentric tubes 304a-304d of the apparatus in accordance with an embodiment of the present disclosure. As previously described the first component 302a and the second component 302b are substantially identical. The tubes 304a-304d are held in position relative to one another by a suitable support structure 318. For example, the support structure 318 includes one or more support members 320 extending between adjacent tubes 304a-304d. In accordance with an embodiment, the support members 320 are positioned at opposite ends 322 (FIG. 3A) of the tubes 304a-304d and/or at intermediate locations within the tubes 304a-304d. The support members 320 are made from a material and are attached to the tubes 304a-304d by a suitable fastening arrangement that substantially minimizes or prevents any interference with the electric current flow 310a/310b or magnetic field 308a/308b or fields generated in the apparatus 300.

Figure 4:
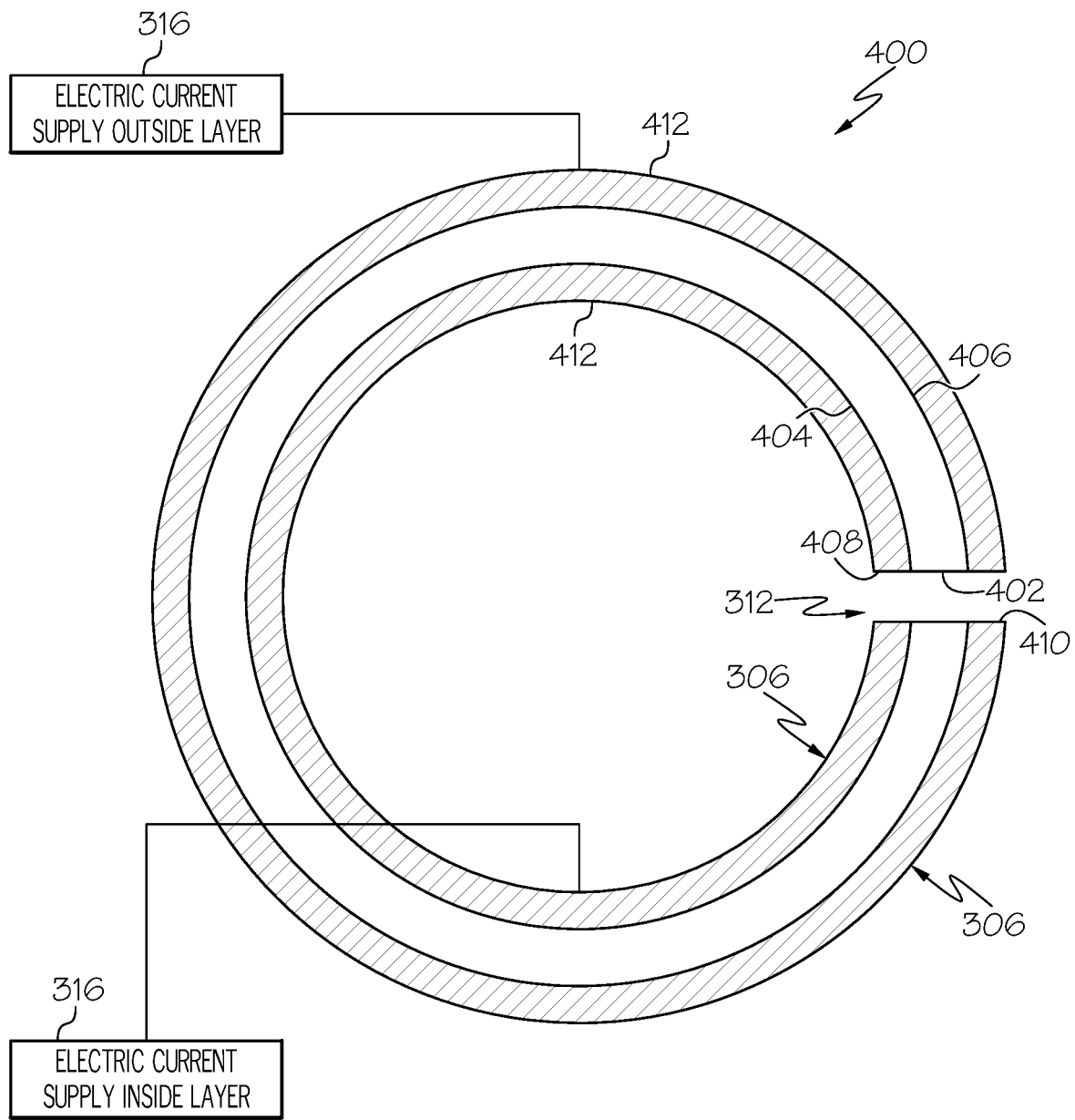
FIG. 4 is a detailed cross-sectional view of an example of a substantially cylindrically shaped tube for use in the apparatus of FIGS. 3A-3C in accordance with an embodiment of the present disclosure.

Referring also to FIG. 4, FIG. 4 is a detailed cross-sectional view of an example of a substantially cylindrically shaped tube 400 for an apparatus for generating a high power energy beam based laser in accordance with an embodiment of the present disclosure. In accordance with an example, the substantially cylindrically shaped tube 400 is used for the tubes 304a-304d for the components 302a and 302b of the exemplary apparatus 300 in FIGS. 3A-3C. The tube 400 or tubes 304a-304d are substantially cylindrically shaped in that the tubes may not be exactly cylindrically shaped and as described herein include an elongated slot 312 formed in each tube 400 and 304a-304d. In accordance with an embodiment, each of the plurality of tubes 304a-304d include a substrate 402. The substrate 402 includes an inner surface 404 and an outer surface 406. An inside layer 408 of electrically conductive material 306 or semiconductor material is disposed on the inner surface 404 of at least each substrate 402 of those tubes 304 that enclose another tube 304 of the plurality of tubes 304a-304d. An outside layer 410 of electrically conductive material 306 or semiconductor material is disposed on the outer surface 406 of each substrate 402 of at least those tubes 304 that are enclosed by another tube 304 of the plurality of tubes 304a-304d of each component 302a and 302b of the apparatus 300.

Also referring back to FIG. 3C, an inner most tube 304a includes an outside layer 410ao of electrically conductive material 306. An electric current supply 316ao is electrically connected to the outside layer 410ao of electrically conductive material 306 for generating current flow in the outside layer 410ao of electrically conductive material 306. A second inner most tube 304b includes an inside layer 408bi of electrically conductive material 306. An electric current supply 316bi is electrically connected to the inside layer 408bi of electrically conductive material 306 for generating current flow in the inside layer 408bi of electrically conductive material 306. The electric current supply 316ao and 316bi are configured to cause current to flow in opposite directions in outside layer 410ao and inside layer 408bi to generate a magnetic field 308ab in a gap 324ab between the tubes 304a and 304b that is compressed into the aperture 314 to a very high strength or high magnetic flux for generating the high power energy beam based laser 102. In accordance with some embodiments, the magnetic field 308ab is compressed to a very high strength or high magnetic flux density of up to about ten Tesla (10 T) or higher by the opposite layers 408 and 410 of electrically conductive material 306 being a superconducting material as described in more detail herein.

Similarly, the second inner most tube 304b includes an outside layer 410bo of electrically conductive material 306 and a third tube 304c includes an inside layer 408ci of electrically conductive material 306. An electric current supply 316bo is electrically connected across the outside layer 410bo of the second inner most tube 304b and another electric current supply 316ci is electrically connected across the inside layer 408ci of the third tube 304c. Similar to that previously described, the current supplies 316bo and 316ci are configured to cause current to flow in opposite directions in the outside layer 410bo of tube 304b and opposing or facing inside layer 408ci of third tube 304c to generate a second magnetic field 308bc in a gap 324bc between second tube 304b and third tube 304c.

The third tube 304c also includes an outside layer 410co of electrically conductive material 306 and a fourth tube 304d includes an inside layer 408di of electrically conductive material 306. An electric current supply 316co is electrically connected across the outside layer 410co of the third tube 304c and another electric current supply 316di is electrically connected across the inside layer 408di of the fourth tube 304d. Similar to that previously described, the current supplies 316co and 316di are configured to cause current to flow in one direction in the outside layer 410co of tube 304c and in an opposite direction in the facing inside layer 408di of fourth tube 304d to generate a third magnetic field 308cd in a gap 324cd between third tube 304c and fourth tube 304d. The magnetic fields 308 generated in the gaps 324 are compressed into the aperture 314 to a very high strength or high magnetic flux. In accordance with some embodiments, the magnetic fields 308 are compressed to a very high strength or high magnetic flux density of up to about 10 T or higher by the adjacent inside layers 408 and outside layers 410 of electrically conductive material 306 being superconducting material as described in more detail herein. Graphs illustrating compression of the magnetic fields in the aperture 314 or channel 126 for an apparatus similar to apparatus 300 are shown in U.S. application Ser. No. 15/784,831, entitled "Apparatus and Method for Magnetic Field Compression." In accordance with another embodiment, the electric current supplies 316 are replaced by a single current supply and the electric current is distributed to the layers 408 and 410 of conductive material 306 by dividing the current from the single current supply. The energy beam 106 is directed through the channel 126 formed by the aligned apertures 314 of both the first component 302a and the second component 302b for generating the high power energy beam based laser 102 in FIG. 1.

In another embodiment the current supplies 316 or single current supply are adjustable for adjusting a balance of currents among the plurality of tubes 304a-304d and modifying the magnetic fields 308 across the apertures 314 and within the channel 126 for real-time tuning the output wavelength 110 of the laser 102. The electric current supply or supplies 316 are configured to supply one of continuous electric currents, alternating electric currents or pulsed electric currents.

Referring again to FIG. 4, in accordance with an embodiment, the substrate 402 of the exemplary tube 400 useable for the tubes 304a-304d includes one of an electrical insulator material, a semiconductor material, or an electrical conductive material. Examples of the substrate material include but are not necessarily limited to magnesium oxide on metal, aluminum oxide on metal, yttrium oxide on metal, glass, sapphire covered tempered glass, carbon fiber composite, aluminate on metal, or aluminate on carbon fiber composite.

In accordance with an embodiment, the inside layer 408, if present in a particular tube 304a-304d, and the outside layer 410, if present in a particular tube 304a-304d, includes a superconducting material 412. Examples of the superconducting material 412 include but are not necessarily limited to a superconducting crystalline material grown on the surfaces 404 and 406 of the substrate 402. The substrate 402 includes any suitable material for growing the superconducting crystalline material. Examples of forming the inside layer 408 and the outside layer 410 of superconducting material 412 include a superconducting metal alloy that is plated on the substrate 402, plasma sprayed on the substrate 402, or thermal-sprayed on the substrate 402. The substrate 402 includes any suitable mechanical frame for the superconducting metal alloy. For example, the substrate 402 includes one of steel, a nickel alloy, carbon fiber composite or other suitable frame material for the superconducting material 412. In accordance with other examples, the superconductors are formed by metalorganic chemical vapor deposition (MOCVD), ion beam assisted deposition (BAD) or other superconductor fabrication techniques.

In accordance with an embodiment, the apparatus 300 includes a device 326 (FIG. 3A) for circulating a coolant 328 between the tubes 304a-304d. Examples of the coolant 328 include liquid nitrogen or other coolant for use in cooling superconducting material.

Figure 5:
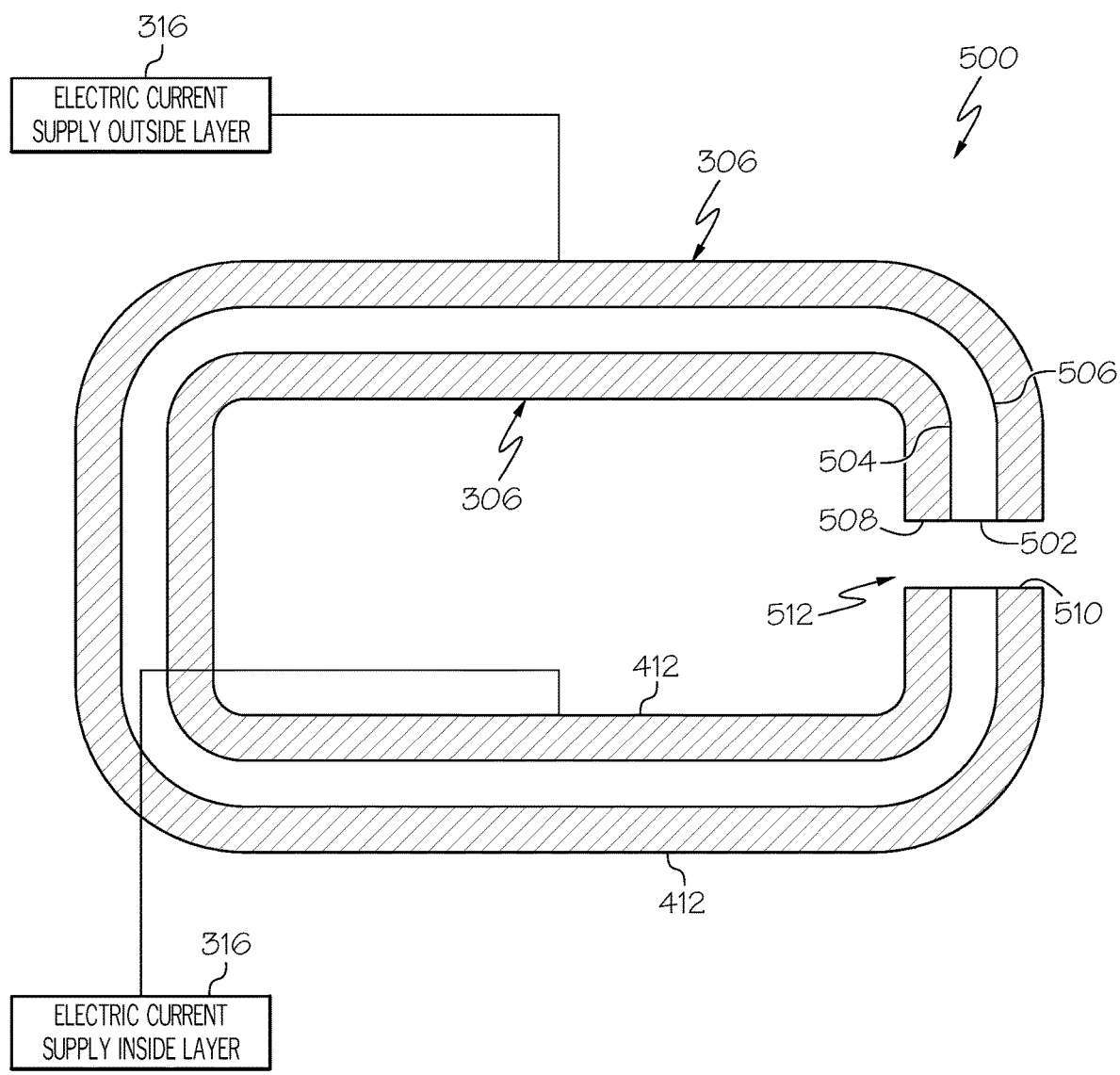
FIG. 5 is a detailed cross-sectional view of an example of a tube for use in the exemplary apparatus in FIGS. 3A-3C in accordance with another embodiment of the present disclosure.

FIG. 5 is a detailed cross-sectional view of an example of a tube 500 for the exemplary apparatus 300 in FIGS. 3A-3C in in accordance with another embodiment of the present disclosure. The exemplary tube 500 is similar to the tube 400 in FIG. 4 except the tube 500 includes a non-cylindrical shape. The exemplary tube 500 illustrated in FIG. 5 is substantially rectangular shaped with rounded corners and an elongated slot 512. The exemplary tube 500 could also have square corners and could be square shaped in other examples. In accordance with other embodiments, the tube 500 is used for the tubes 304a-304d in FIGS. 3A-3C. The tube 500 includes a substrate 502 with an inner surface 504 and an outer surface 506. An inside layer 508 of electrically conductive material 306 or semiconductor material is disposed on the inner surface 504 of each substrate 502 of at least those tubes 500 or 304a-304d that enclose another smaller tube of the plurality of tubes 304a-304d. An outside layer 510 of electrically conductive material 306 or semiconductor material is disposed on the outer surface 506 of each substrate 502 of at least those tubes 500 or 304a-304d that are enclosed by another larger tube of the plurality of tubes 304a-304d. In accordance with another embodiment, the electrically conductive material 306 is a superconducting material similar to that previously described.

Figure 6:
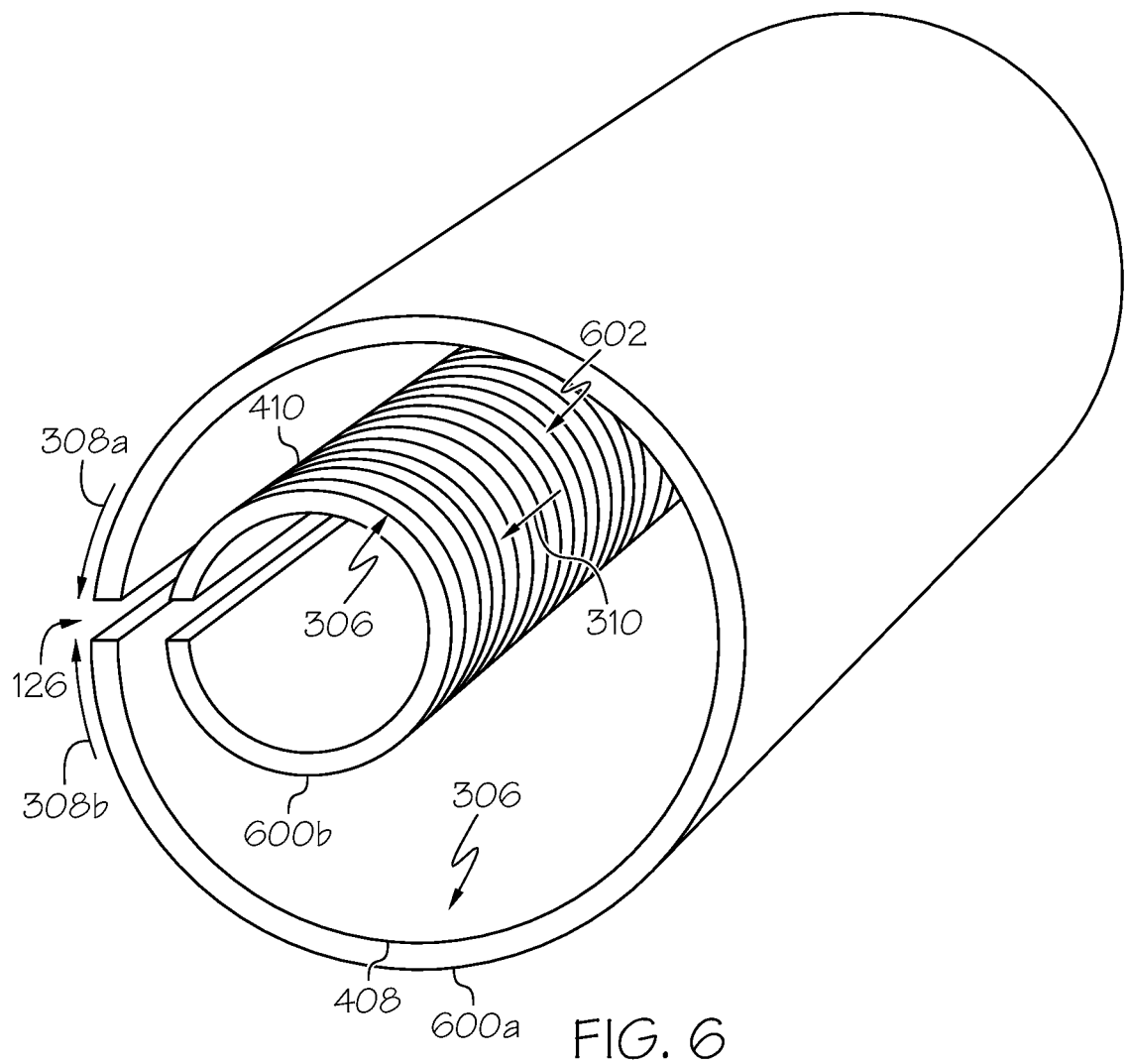
FIG. 6 is a perspective view of an example of nonconcentric tubes for use in the exemplary apparatus in FIGS. 3A-3C in accordance with a further embodiment of the present disclosure.

FIG. 6 is a perspective view of an example of nonconcentric tubes 600a-600b for use in the exemplary apparatus 300 in FIGS. 3A-3C in accordance with a further embodiment of the present disclosure. Only two concentric tubes 600a and 600b are shown in FIG. 6 for purposes of explaining the embodiment although any number of concentric tubes may be used as described with reference to FIGS. 3A-3C. In the embodiment illustrated in FIG. 6, an outside layer 410 of electrically conductive material 306 on an inner tube 600b includes a plurality of ridges 602 for modulating the electric current 310 flowing in the outside layer 410 of electrically conductive material 306 for modifying at least one of a first magnetic field 308a or a second magnetic field 308b across the channel 126 for tuning the output wavelength 110 of the laser 102 (FIG. 1). However, in other embodiments, the inside layer 408 of electrically conductive material 306 or the outside layer 410 of electrically conductive material 306 or both include the plurality of ridges 602 for modulating the electric current 310 flowing in the electrically conductive material 306 for modifying at least one of the first magnetic field 308a or the second magnetic field 308b across the channel 126 for tuning the output wavelength 110 of the laser 102 (FIG. 1).

Figure 7A:
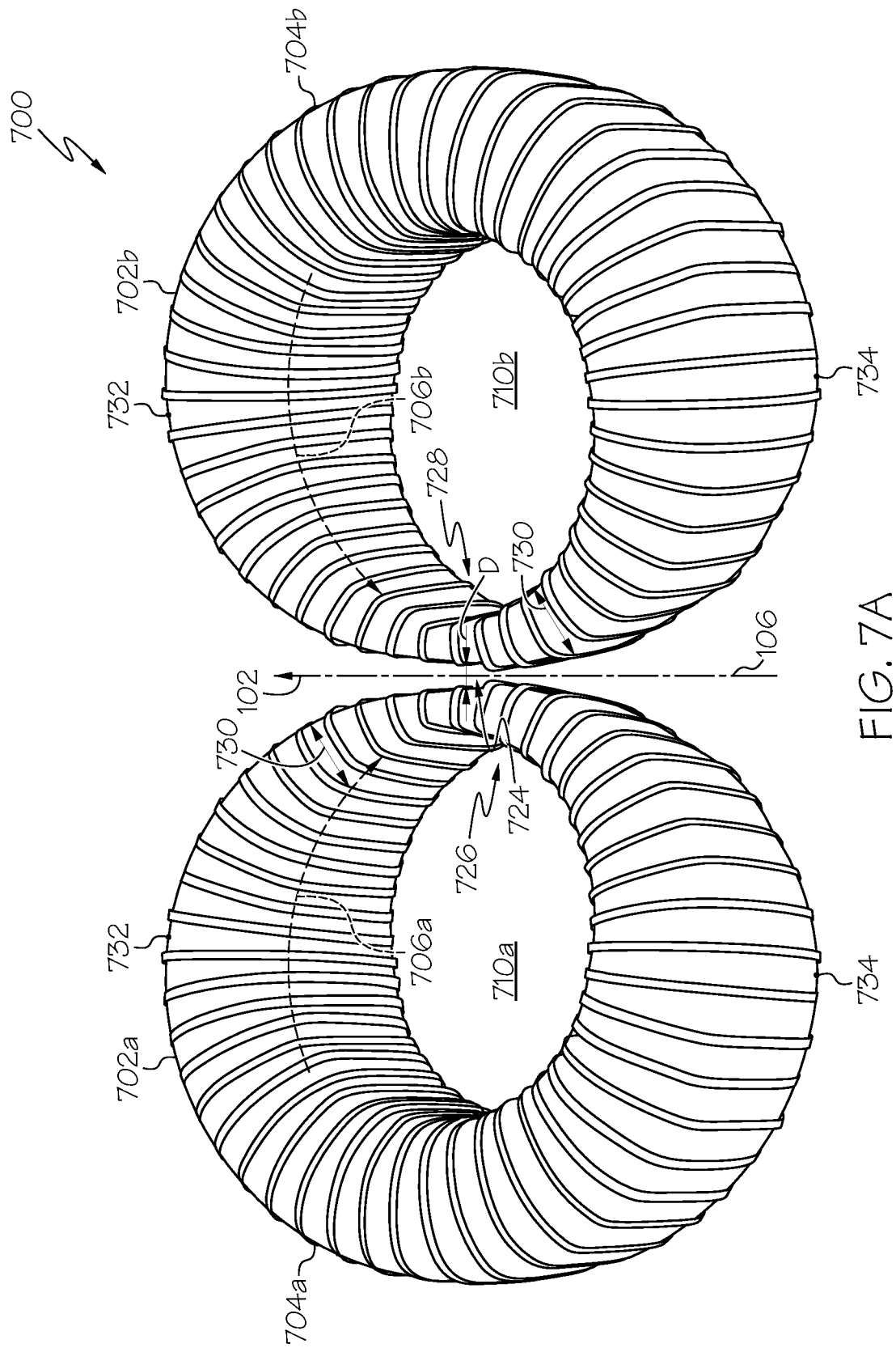
FIGS. 7A and 7B are each a perspective view of an example of an apparatus for use as a quantum well in a system for generating a high power energy beam based laser in accordance with a further embodiment of the present disclosure.
Figure 7B:
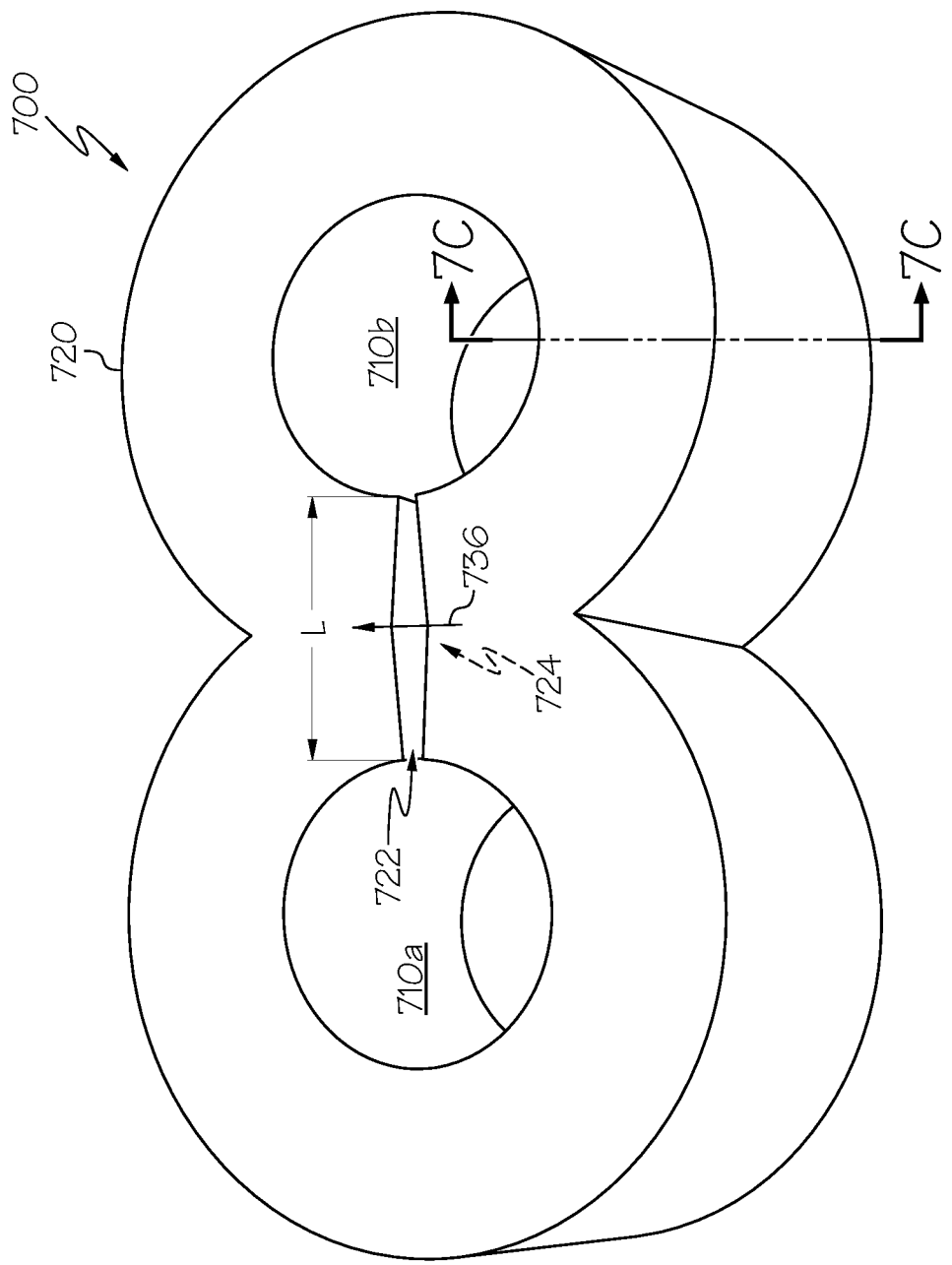
Figure 7C:
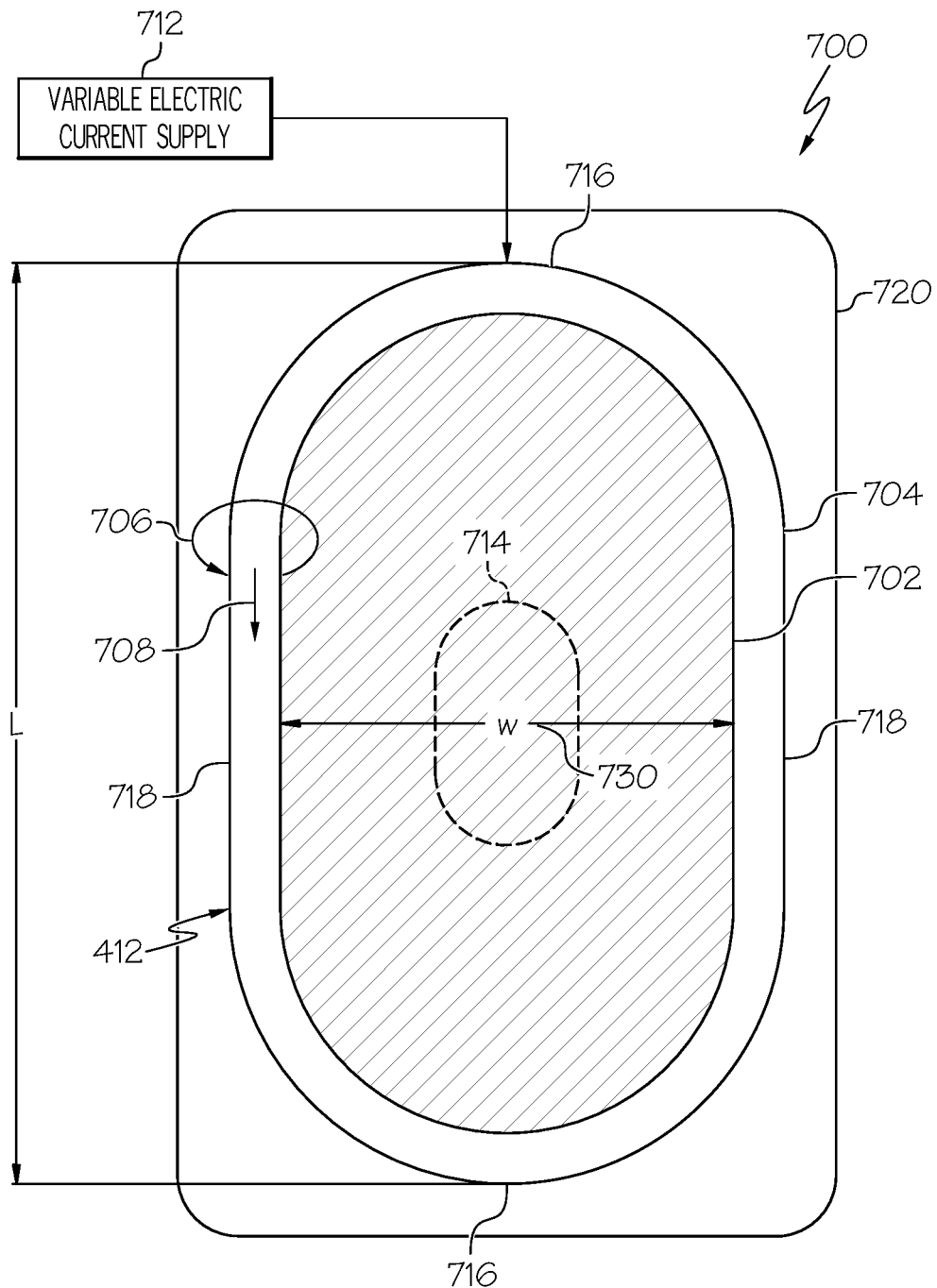
FIG. 7C is a detailed cross-sectional view of the apparatus in FIGS. 7A-7B taken along lines 7C-7C in FIG. 7B.

FIGS. 7A and 7B are each a perspective view of an example of an apparatus 700 for use as a quantum well in a system for generating a high power energy beam based laser in accordance with a further embodiment of the present disclosure. FIG. 7B shows a magnetic or magnetic or diamagnetic material 720 enclosing a first plurality of coils 704a and a second plurality of coils 704b respectively wound around a first toroid 702a and a second toroid 702b in FIG. 1A. FIG. 7C is a detailed cross-sectional view of the apparatus in FIGS. 7A-7B taken along lines 7C-7C in FIG. 7B. In accordance with an embodiment, the apparatus 700 is used for the apparatus 108 in the system 100 in FIG. 1. The apparatus 700 includes a first toroid 702a and a second toroid 702b. The first toroid 702a and the second toroid 702b include or are formed from an electrical insulator material. An example of the electrical insulator material includes but is not necessarily limited to a G10 material or other composite material suitable for cryogenic applications. The first toroid 702a corresponds to the first component 114 of the apparatus 108 in FIG. 1 and the second toroid 702b corresponds to the second component 120. In accordance with other embodiments, the first toroid 702a and the second toroid 702b each include a geometric shape other than a circular shape or doughnut shape in a plan view of the first toroid 702a and the second toroid 702b. In accordance with an example, the first toroid 702a and the second toroid 702b each include an elliptical shape, ellipsoid shape or are oblong in one direction. Other geometric shapes are applicable depending upon the application and/or desired distribution of the magnetic field or fields associated with the first toroid 702a and the second toroid 702b.

Figure 9A:
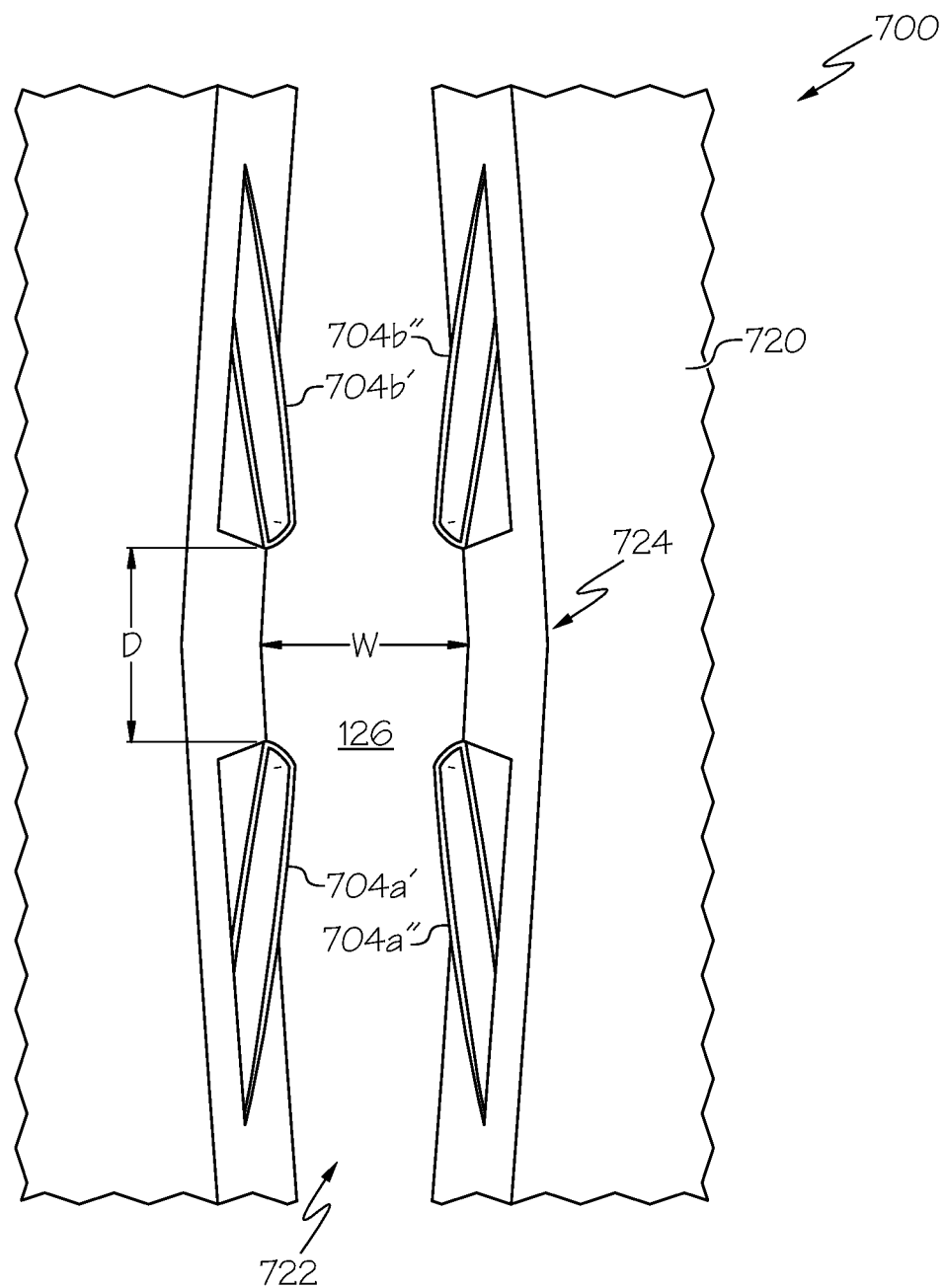
FIGS. 9A and 9B are each a view of a portion of the apparatus in FIGS. 7A and 7B illustrating an example of the coils being rotated in the elongated slot or channel of the apparatus to modify the magnetic fields in the elongated slot in accordance with an embodiment of the present disclosure.

A first plurality of separate coils 704a are wound around the first toroid 702a. The first plurality of coils 704a are placed about a circumference of the first toroid 702a and each coil 704a generates a first magnetic field 706a in response to electric current 708 (FIG. 7C) flowing in the coil 704a. The first magnetic field 706a corresponds to the first magnetic field 116 in FIG. 1. A second plurality of separate coils 704b are wound around the second toroid 702b. The second plurality of coils 704b are placed about a circumference of the second toroid 702b and each coil 704b generates a second magnetic field 706b in response to electric current 708 flowing in the coil 704b. A circular center opening 710a of the first toroid 702a and a circular center opening 710b of the second toroid 702b are in a same plane and the second toroid 702b is disposed adjacent the first toroid 702a at a predetermined distance ("D") from the first toroid 702a as best shown in FIG. 9A.

In accordance with the embodiment illustrated in FIG. 7A, the first plurality of coils 704a are uniformly spaced about the circumference of the first toroid 702a and the second plurality of coils 704b are uniformly spaced about the circumference of the second toroid 702b. In another embodiment, the first plurality of coils 704a and/or the second plurality of coils 704b are non-uniformly spaced or are spaced according to a preset pattern to provide a particular magnetic field distribution within the first toroid 702a and/or the second toroid 702b.

Referring also to FIG. 7C, the toroid 702 in FIG. 7C corresponds to either the first toroid 702a or the second toroid 702b and the coil 704 corresponds to either one of the first plurality of coils 704a or one of the second plurality of coils 704b. Each coil 704 includes electrically conductive material or semiconductor material. In accordance with an embodiment, the coils 704 are formed from or include a superconducting material 412 similar to that previously described with respect to tubes 304a-304d and 400 in FIGS. 3A-3C and 4. Each coil 704 generates a magnetic field 706 in response to electric current 708 flowing in the coil 704. In accordance with an embodiment, a separate electric current supply 712 is electrically connected to each coil 704. In another embodiment, one electric current supply is configured to individual feed each coil 704a associated with the first toroid 702a and another electric current supply is configured to individually feed each coil 704b associated with the second toroid 702b. In a further embodiment, a single electric current supply is configured to individually feed each coil 704a and 704b in both the first toroid 702a and the second toroid 702b. The electric current supply 712 or supplies are configured to supply one of continuous electric currents, alternating electric currents or pulsed electric currents. The magnetic field 706 is compressed or has a highest magnetic flux density proximate a center or central region 714 of the coils 704 around a circumference of each toroid 702. In accordance with an embodiment, the magnetic or diamagnetic material 720 includes a differential magnetic permeability close to about zero (0) henries per meter (H/m) for small magnetic field amplitude changes to provide a strong magnetic or diamagnetic effect on the superconductor response of the coils 704.

In accordance with an embodiment, the first toroid 702a and the second toroid 702b and associated coils 704a and 704b around each respective toroid 702a and 702b include opposite rounded ends 716 connected by opposite elongated sides 718 as best shown in FIG. 7C. Each of the coils 704 include a uniform radial width (W). In other embodiments, a cross-section the first toroid 702a and the second toroid 702b and associated coils 704a and 704b define different geometric shapes depending upon the application. For example, the cross-section of the first toroid 702a and the second toroid 702b may be circular, elliptical, square or some other geometric shape.

Referring also to FIG. 7B, as previously described, a magnetic or diamagnetic material 720 encloses the first plurality of coils 704a and the second plurality of coils 704b in FIG. 7A and the first toroid 702a and the second toroid 702b around which the coils 704a and 704b are respectively wound. An elongated slot 722 is formed in the magnetic or diamagnetic material 720 at a location 724 (FIG. 7A) where coils 704 of the first plurality of coils 704a and the second plurality of coils 704b are closest. In accordance with an embodiment and as illustrated in FIG. 9A, the elongated slot 722 extends between two adjacent coils 704a' and 704a" of the first plurality of coils 704a and two adjacent coils 704b' and 704b" of the second plurality of coils 704b. The elongated slot 722 defines the channel 126 through which the energy beam 106 passes to generate the laser 102.

In the embodiment illustrated in FIG. 7A, a first group of the coils 726 of the first plurality of coils 704a and a second group of coils 728 of the second plurality of coils 704b each include a size that respectively gradually decrease over a predetermined portion of each toroid 702a and 702b. A cross-section of each toroid 702a and 702b gradually decreases in size over the predetermined portion of each toroid 702a and 702b in correspondence with the respective gradual decrease in size of the coils 306 over the predetermine portion 310. In accordance with an embodiment, the first group of the coils 726 of the first plurality of coils 704a and the second group of coils 728 of the second plurality of coils 704b gradually decrease in size over about half or less than about half a circumference of each of the first toroid 702a and the second toroid 702b. The radial widths ("W") 730 and lengths ("L") (FIG. 7C) of the coils 704 gradual decrease from respective pairs of points 732 and 734 on each toroid that are spaced about half or less than about half the circumference apart on each toroid to modify the first magnetic field 706a and the second magnetic field 706b in the elongated slot 722 for tuning the output wavelength 110 of the laser 102. The channel 126 is in a direction traverse or perpendicular to a longitudinal length ("L") of the elongated slot 722 (FIG. 7B).

Figure 8:
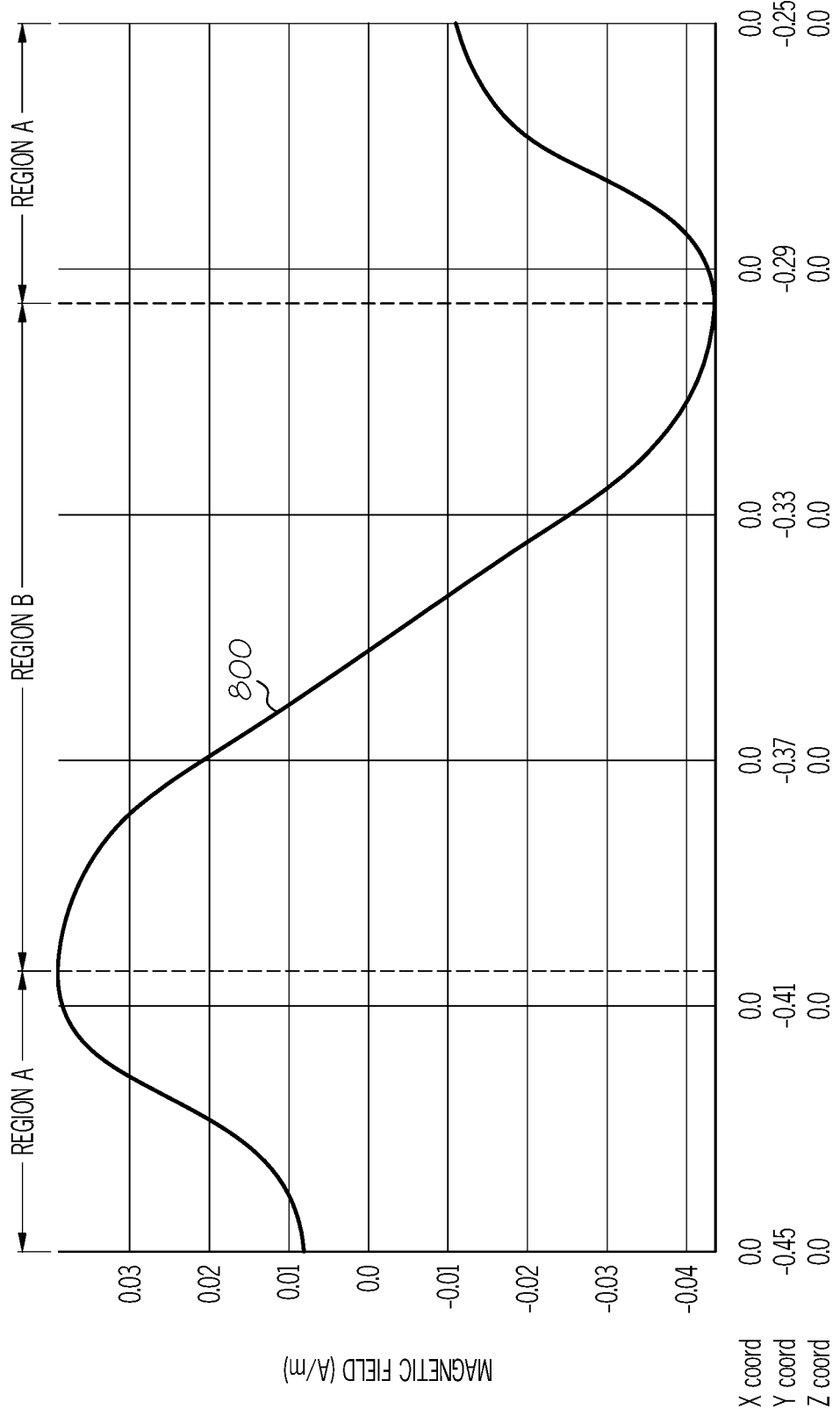
FIG. 8 is a graph illustrating the magnetic field measured across an elongated slot in a direction perpendicular to a longest dimension of the elongated slot in the magnetic or diamagnetic material in FIG. 7B.

FIG. 8 is a graph 800 illustrating the magnetic field 706 measured across the elongated slot 722 or channel 126 in a direction 736 perpendicular to the longitudinal length L of the elongated slot 722 in the magnetic or diamagnetic material 720 in FIG. 7B. The direction 736 in FIG. 7B corresponds to an X direction in the graph 800. Accordingly, the energy beam 106 wiggles back and forth through the elongated slot 722 about the X equal zero (0) point due to the changing magnetic fields 706a and 706b in the elongated slot 722. The energy beam 106 will spend most of its time in regions A and will travel quickly through region B in FIG. 8. By causing the magnetic field 706 in region A to vary as an inverse square root, then for most of the time, the energy beam 106 will be in the proper environment to produce lasing.

In accordance with an embodiment, the electric current supply 712 (FIG. 7C) is a variable electric current supply electrically connected to at least coils 704a and/or 704b proximate the elongated slot 722 formed in the magnetic or diamagnetic material 720. The electric current 708 flowing in the coils 704a and/or 704b is modulated to modify at least one of the first magnetic field 706a and the second magnetic field 706b in the elongated slot 722 for tuning the output wavelength 110 of the laser 102 (FIG. 1).

Figure 9B:
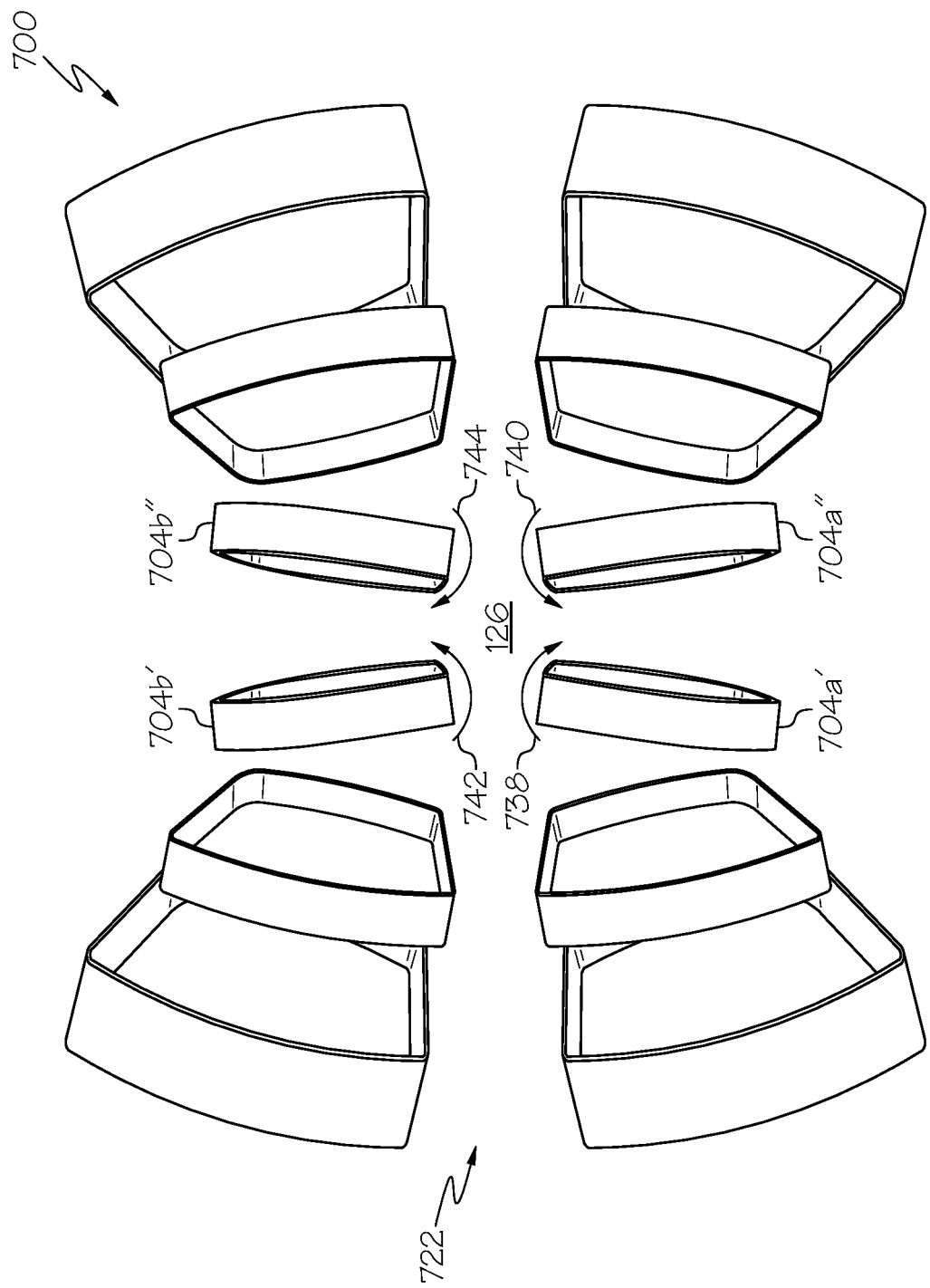

FIGS. 9A and 9B are each a view of a portion of the apparatus 700 in FIGS. 7A and 7B illustrating an example of the coils 704 being rotated in the elongated slot 722 or channel 126 of the apparatus 700 to modify the magnetic fields 706a and 706b in the elongated slot 722 in accordance with an embodiment of the present disclosure. The two adjacent coils 704a' and 704a" of the first plurality of separate coils 704a and the two adjacent coils 704b' and 704b" of the second plurality of separate coils 704b that are proximate the elongated slot 722 or channel 126 are rotated a predetermined number of degrees with respect to the elongated slot 722 to modify at least one of the first magnetic field 706a and the second magnetic field 706b in the elongated slot 722 for tuning the output wavelength 110 of the laser 102 (FIG. 1). The elongated slot 722 has a predetermined width ("W") at the location 724 between the closest coils of the first plurality of coils 704a and the second plurality of coils 704b. In accordance with an embodiment, coil 704a' of the first plurality of coils 704a is rotated in a clockwise direction as illustrated by arrow 738 in FIG. 9B about ten degrees (10°) from a normal orientation corresponding with the other first plurality of coils 704a and coil 704a" is rotated in a counterclockwise direction as illustrated by arrow 740 about ten degrees (10°) from a normal orientation corresponding with the other coils 704a. Similarly, coil 704b' of the second plurality of coils 704b is rotated in a counterclockwise direction as illustrated by arrow 742 in FIG. 9B about ten degrees (10°) from its normal orientation corresponding with the other coils 704b and coil 704b" is rotated in a clockwise direction as illustrated by arrow 744 about ten degrees (10°) from its normal orientation with the other coils 704b.

In accordance with another embodiment, the predetermined distance "D" (FIG. 9A) between the first toroid 702a and the second toroid 702b or distance between the closest coils of the first plurality of coils 704a and the second plurality of coils 704b is changed or adjusted to modify the first magnetic field 706a and the second magnetic field 706b in the elongated slot 722 or channel 126 for tuning the output wavelength 110 of the laser 102 (FIG. 1).

Figure 10:
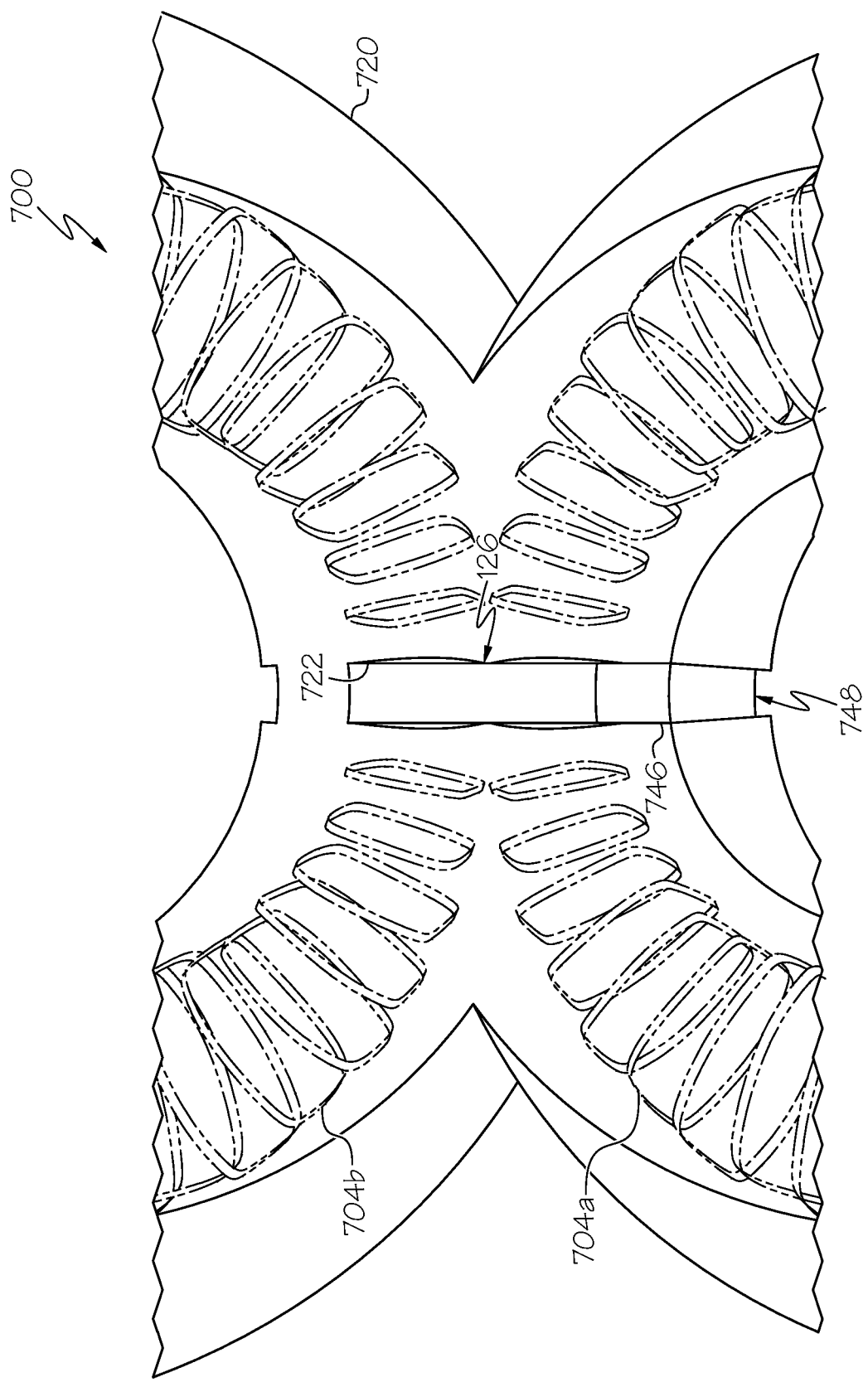
FIG. 10 is a view of a portion of the apparatus in FIGS. 7A and 7B illustrating an example of a segment of magnetic or diamagnetic material being inserted into one or more selected locations in the elongated slot to modify the magnetic field in the elongated slot in accordance with another embodiment of the present disclosure.

FIG. 10 is a view of a portion of the apparatus 700 in FIGS. 7A and 7B illustrating an example of a segment 746 of magnetic or diamagnetic material 720 being inserted into one or more selected locations 748 in the elongated slot 722 to modify the magnetic fields 706a and 706b in the elongated slot 722 for tuning the output wavelength 110 of the laser 102 in accordance with another embodiment of the present disclosure.

Accordingly, the apparatus 700 is configurable or controllable for tuning the output wavelength 110 of the laser 102 by at least one of: rotating coils 704a and/or 704b proximate the elongated slot 722 or channel 126 a predetermined number of degrees with respect to the elongated slot 722 or channel 126 to modify at least one of the first magnetic field 706a and the second magnetic field 706b in the elongated slot 722 or channel 126 for tuning the output wavelength 110 of the laser 102; changing, for example, decreasing a radial width of coils 704 proximate the elongated slot 722 or channel 126 to modify at least one of the first magnetic field 706a and the second magnetic field 706b in the elongated slot 722 for tuning the output wavelength 110 of the laser 102; adjusting the predetermined distance "D" between the first toroid 702a and the second toroid 702b to modify at least one of the first magnetic field 706a and the second magnetic field 706b in the elongated slot 722 for tuning the output wavelength 110 of the laser 102; inserting a segment 746 of magnetic or diamagnetic material 720 into a selected location 748 or locations in the elongated slot 722 to modify at least one of the first magnetic field 706a and the second magnetic field 706b in the elongated slot 722 for tuning the output wavelength 110 of the laser 102; and modulating the electric current 708 flowing in at least the coils 704 proximate the elongate slot 722 or channel 126 to modify at least one of the first magnetic field 706a and the second magnetic field 706b in the elongated slot 722 or channel 126 for tuning the output wavelength 110 of the laser 102.

Figure 11:
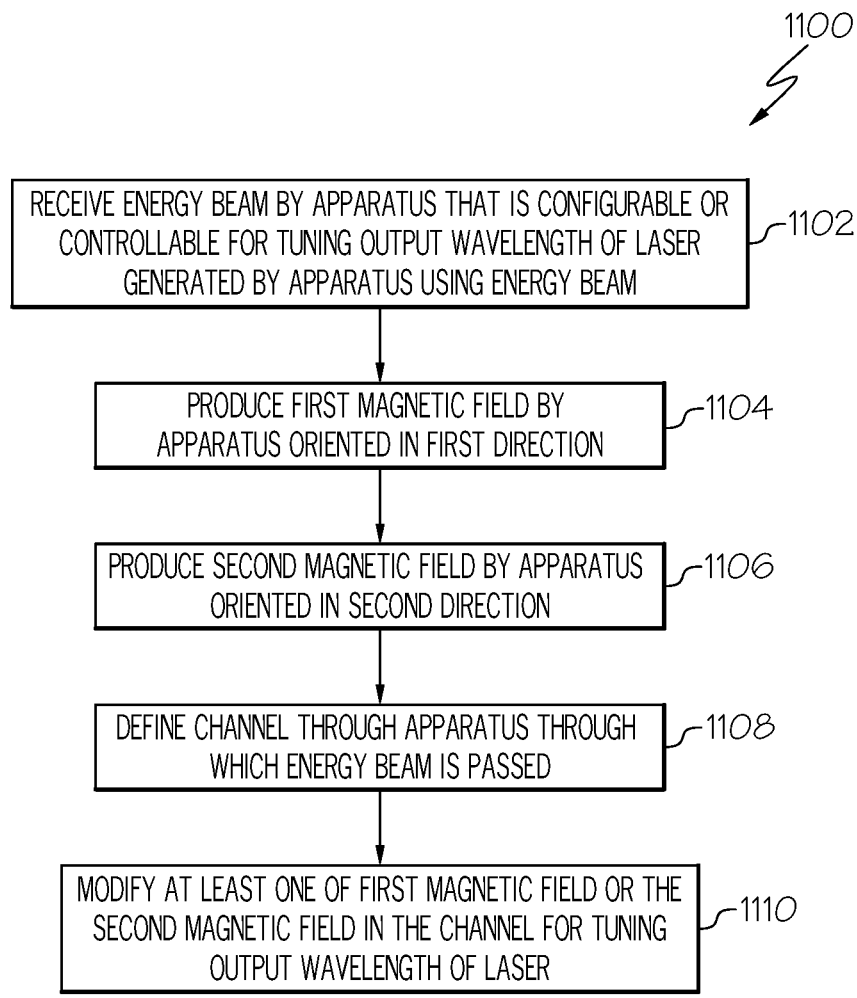
FIG. 11 is a flow chart of an example of a method for generating a high power energy beam based laser in accordance with an embodiment of the present disclosure.

FIG. 11 is a flow chart of an example of a method 1100 for generating a high power energy beam based laser in accordance with an embodiment of the present disclosure. In accordance with an embodiment, the method 1100 is embodied in and performed by the system 100 in FIG. 1 which in different embodiments includes one of the apparatuses 200, 300 or 700. In block 1102, an energy beam is received by an apparatus that is configurable or controllable for tuning an output wavelength of a laser or laser beam generated by the apparatus using the energy beam.

In block 1104, a first magnetic field is produced that is oriented in a first direction. In block 1106, a second magnetic field is produced that is oriented in a second direction substantially opposite to the first direction. As previously described, in some embodiments, the second magnetic field is oriented exactly opposite the first magnetic field. In other embodiments, the second magnetic field is oriented at some angle that is different from exactly opposite the first magnetic field at some locations within the apparatus.

In block 1108, a channel is formed or defined through the apparatus through which the energy beam passes. In block 1110, at least one of the first magnetic field and the second magnetic field are modified in the channel for tuning the output wavelength of the laser. In accordance with different embodiments, the first magnetic field and/or the second magnetic field are modified by one or more of the techniques described herein for tuning the output wavelength of the laser.

Figure 12:
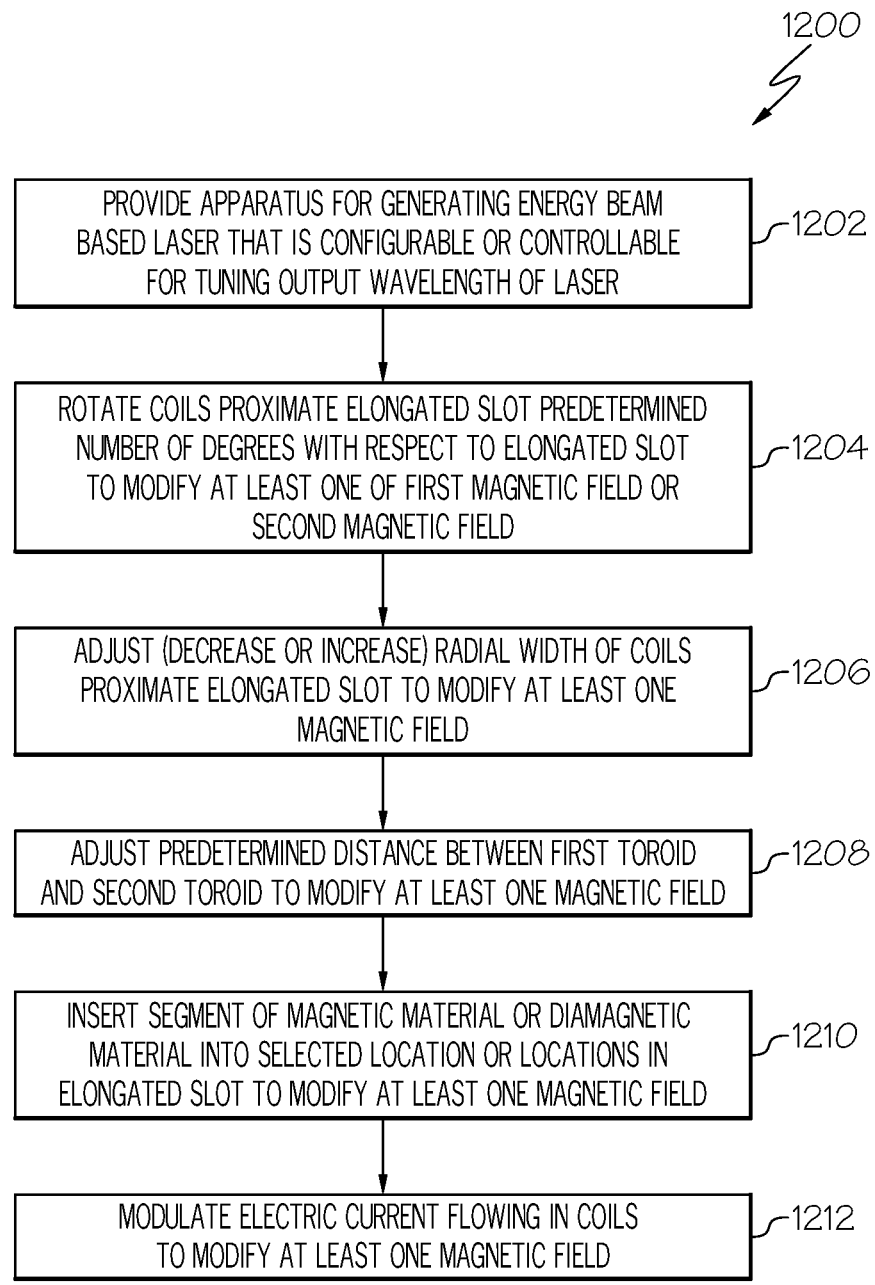
FIG. 12 is a flow chart of an example of a method for tuning an output of an energy beam based laser in accordance with an embodiment of the present disclosure.

FIG. 12 is a flow chart of an example of a method 1200 for tuning an output wavelength of an energy beam based laser. In block 1202, an apparatus is provided for generating an energy beam based laser. The apparatus is configurable or controllable for tuning an output wavelength of the laser. In accordance with an embodiment, the apparatus is similar to the apparatus 700 in FIGS. 7A-7C and 9A-10.

In block 1204, coils 704a and 704b proximate the elongated slot 722 are rotated a predetermined number of degrees with respect to the elongated slot 722 to modify at least one of the first magnetic field 706a or the second magnetic field 706b in the elongated slot 722 for tuning the output wavelength 110 of the laser 102.

In block 1206, a radial width 730 of coils 704a, 704b proximate the elongated slot 722 is adjusted (increased or decreased) to modify at least one of the first magnetic field 706a or the second magnetic field 706b in the elongated slot 722 for tuning the output wavelength 110 of the laser 102.

In block 1208, the predetermined distance (D) between the first toroid 702a and the second toroid 702b is adjusted to modify at least one of the first magnetic field 706a and the second magnetic field 706b in the elongated slot 722 for tuning the output wavelength 110 of the laser 102.

In block 1210, a segment 746 of magnetic or diamagnetic material is inserted into a selected location or locations 748 in the elongated slot 722 to modify at least one of the first magnetic field 706a or the second magnetic field 706b in the elongated slot 722 for tuning the output wavelength 110 of the laser 102.

In block 1212, the electric current 708 flowing in the coils 704a, 704b is modulated to modify at least one of the first magnetic field 706a or the second magnetic field 706b in the elongated slot 722 for tuning the output wavelength 110 of the laser 102.

The embodiments described herein provide lighter weight and less bulky implementations for free-electron lasers. Additionally, the embodiments described herein provide variable wavelength operation with real-time tenability.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A system for generating an energy beam based laser, comprising:
   an apparatus for receiving an energy beam and for generating an energy beam based laser, the apparatus being configurable or controllable for tuning an output wavelength of the laser generated by the apparatus using the energy beam, the apparatus comprising:
   a first component for producing a first magnetic field oriented in a first direction, wherein the first component comprises a first toroid;
   a second component for producing a second magnetic field oriented in a second direction substantially opposite to the first direction, wherein the second component comprises a second toroid, a center opening of the first toroid and the second toroid are in a same plane and the second toroid is disposed adjacent the first toroid at a predetermined distance from the first toroid; and
   a channel through the apparatus defined by the first component and the second component through which the energy beam passes to generate the laser at an output of the apparatus, wherein the apparatus is configurable or controllable for modifying at least one of the first magnetic field and the second magnetic field for tuning the output wavelength of the laser, the channel being defined within the predetermined distance between the first toroid and the second toroid.

2. The system of claim 1, wherein the first component comprises:
   a first plurality of separate coils wound around the first toroid, the first plurality of coils being placed about a circumference of the first toroid and each coil generating a first magnetic field in response to electric current flowing in the coil;
   wherein the second component comprises:
   a second plurality of separate coils wound around the second toroid, the second plurality of coils being placed about a circumference of the second toroid and each coil generating a second magnetic field in response to electric current flowing in the coil;
   wherein the apparatus further comprises:
   a magnetic or diamagnetic material enclosing the first plurality of coils and the second plurality of coils; and
   an elongated slot formed in the magnetic or diamagnetic material at a location where coils of the first plurality of coils and the second plurality of coils are closest, the elongated slot extending radially between two adjacent coils of the first plurality of separate coils and two adjacent coils of the second plurality of separate coils, wherein the elongated slot defines the channel through which the energy beam passes to generate the laser.

3. The system of claim 2, wherein the first toroid, the first plurality of coils around the first toroid, the second toroid and the second plurality of coils around the second toroid comprise opposite rounded ends connected by elongated sides.

4. The system of claim 3, wherein each of the coils comprises a uniform radial width.

5. The system of claim 3, wherein a first group of the coils of the first plurality of coils and a second group of coils of the second plurality of coils each comprise a size that respectively gradually decrease over about half or less than about a circumference of each of the first toroid and the second toroid from respective pairs of points on each toroid that are spaced about half or less than about the circumference apart on each toroid to modify the first magnetic field and the second magnetic field in the elongated slot for tuning the output wavelength of the laser.

6. The system of claim 2, wherein the two adjacent coils of the first plurality of separate coils and the two adjacent coils of the second plurality of separate coils that are proximate the elongated slot are rotated a predetermined number of degrees with respect to the elongated slot to modify at least one of the first magnetic field and the second magnetic field in the elongated slot for tuning the output wavelength of the laser.

7. The system of claim 2, wherein the predetermined distance between the first toroid and the second toroid is changed to modify the first magnetic field and the second magnetic field in the elongated slot for tuning the output wavelength of the laser.

8. The system of claim 2, wherein a segment of magnetic or diamagnetic material is inserted into a selected location in the elongated slot to modify at least one of the first magnetic field and the second magnetic field in the elongated slot for tuning the output wavelength of the laser.

9. The system of claim 2, further comprising a variable electric current supply electrically connected to at least coils proximate the elongated slot, wherein the electric current flowing in the coils is modulated to modify at least one of the first magnetic field and the second magnetic field in the elongated slot for tuning the output wavelength of the laser.

10. A system for generating an energy beam based laser, comprising:
 an apparatus for receiving an energy beam and for generating an energy beam based laser, the apparatus being configurable or controllable for tuning an output wavelength of the laser generated by the apparatus using the energy beam, the apparatus comprising:
  a first toroid;
  a first plurality of separate coils wound around the first toroid, the first plurality of coils being placed about a circumference of the first toroid and each coil generating a first magnetic field in response to electric current flowing in the coil;
  a second toroid;
  a second plurality of separate coils wound around the second toroid, the second plurality of coils being placed about a circumference of the second toroid and each coil generating a second magnetic field in response to electric current flowing in the coil, wherein a circular center opening of the first toroid and the second toroid are in a same plane and the second toroid is disposed adjacent the first toroid at a predetermined distance from the first toroid;
  a magnetic or diamagnetic material enclosing the first plurality of coils and the second plurality of coils; and
  an elongated slot formed in the magnetic or diamagnetic material at a location where coils of the first plurality of coils and the second plurality of coils are closest, the elongated slot extending radially between two adjacent coils of the first plurality of separate coils and two adjacent coils of the second plurality of separate coils, wherein the elongated slot defines a channel through which the energy beam passes to generate the laser at an output of the apparatus and the apparatus is configurable or controllable for modifying at least one of the first magnetic field and the second magnetic field for tuning the output wavelength of the laser.

11. The system of claim 10, wherein the apparatus is configurable or controllable for tuning the output wavelength of the laser by at least one of:
 rotating coils proximate the elongated slot a predetermined number of degrees with respect to the elongated slot to modify at least one of the first magnetic field and the second magnetic field in the elongated slot for tuning the output wavelength of the laser;
 decreasing a radial width of coils proximate the elongated slot to modify at least one of the first magnetic field and the second magnetic field in the elongated slot for tuning the output wavelength of the laser;
 adjusting the predetermined distance between the first toroid and the second toroid to modify at least one of the first magnetic field and the second magnetic field in the elongated slot for tuning the output wavelength of the laser;
 inserting a segment of magnetic or diamagnetic material into a selected location in the elongated slot to modify at least one of the first magnetic field and the second magnetic field in the elongated slot for tuning the output wavelength of the laser; and
 modulating the electric current flowing in the coils to modify at least one of the first magnetic field and the second magnetic field in the elongated slot for tuning the output wavelength of the laser.

12. A method for generating an energy beam based laser, comprising:
 receiving an energy beam by an apparatus that is configurable or controllable for tuning an output wavelength of a laser generated by the apparatus using the energy beam, wherein the apparatus comprises a first toroid and a second toroid, a center opening of the first toroid and the second toroid are in a same plane and the second toroid is disposed adjacent the first toroid at a predetermined distance from the first toroid;
 producing a first magnetic field oriented in a first direction;
 producing a second magnetic field oriented in a second direction substantially opposite to the first direction;
 defining a channel through the apparatus through which the energy beam passes, the channel being defined within the predetermined distance between the first toroid and the second toroid; and
 modifying at least one of the first magnetic field and the second magnetic field in the channel for tuning the output wavelength of the laser.

13. The method of claim 12, wherein a first plurality of separate coils is wound around the first toroid, the first plurality of coils being placed about a circumference of the first toroid and each coil generating the first magnetic field in response to electric current flowing in the coil, and wherein a second plurality of separate coils is wound around the second toroid, the second plurality of coils being placed about a circumference of the second toroid and each coil generating the second magnetic field in response to electric current flowing in the coil.

14. The method of claim 13, wherein each of the coils comprises a uniform radial width.

15. The method of claim 13, wherein a first group of the coils of the first plurality of coils and a second group of coils of the second plurality of coils each comprise a size that respectively gradually decrease over a predetermined portion of each of the first toroid and the second toroid to modify the first magnetic field and the second magnetic field for tuning the output wavelength of the laser.

16. The method of claim 13, wherein the predetermined distance between the first toroid and the second toroid is changed to modify the first magnetic field and the second magnetic field for tuning the output wavelength of the laser.

17. The method of claim 13, wherein the first plurality of coils and the second plurality of coils are enclosed in a magnetic or a diamagnetic material and an elongated slot is formed in the magnetic or the diamagnetic material at a location where coils of the first plurality of coils and the second plurality of coils are closest, the elongated slot extending radially between two adjacent coils of the first plurality of separate coils and two adjacent coils of the second plurality of separate coils, wherein the elongated slot defines the channel through which the energy beam passes to generate the laser.

18. The method of claim 17, wherein the two adjacent coils of the first plurality of separate coils and the two adjacent coils of the second plurality of separate coils that are proximate the elongated slot are rotated a predetermined number of degrees with respect to the elongated slot to modify at least one of the first magnetic field and the second magnetic field in the elongated slot for tuning the output wavelength of the laser.

19. The method of claim 17, wherein a segment of magnetic or diamagnetic material is inserted into a selected location in the elongated slot to modify at least one of the first magnetic field and the second magnetic field in the elongated slot for tuning the output wavelength of the laser.

20. The method of claim 17, further comprising a variable electric current supply electrically connected to at least coils proximate the elongated slot, wherein the electric current flowing in the coils is modulated to modify at least one of the first magnetic field and the second magnetic field in the elongated slot for tuning the output wavelength of the laser.

* * * * *